US011162565B2

(12) United States Patent
Matsuto et al.

(10) Patent No.: US 11,162,565 B2
(45) Date of Patent: Nov. 2, 2021

(54) ELECTRIC ACTUATOR

(71) Applicant: NTN CORPORATION, Osaka (JP)

(72) Inventors: Takushi Matsuto, Shizuoka (JP);
Shinsuke Hirano, Shizuoka (JP);
Atsushi Ikeda, Shizuoka (JP); Tomomi
Ishikawa, Shizuoka (JP); Yoshinori
Ikeda, Shizuoka (JP)

(73) Assignee: NTN CORPORATION, Osaka (JP)

( * ) Notice: Subject to any disclaimer, the term of this
patent is extended or adjusted under 35
U.S.C. 154(b) by 452 days.

(21) Appl. No.: 16/084,031

(22) PCT Filed: Mar. 24, 2017

(86) PCT No.: PCT/JP2017/012193
§ 371 (c)(1),
(2) Date: Sep. 11, 2018

(87) PCT Pub. No.: WO2017/170291
PCT Pub. Date: Oct. 5, 2017

(65) Prior Publication Data
US 2020/0292039 A1 Sep. 17, 2020

(30) Foreign Application Priority Data

Mar. 30, 2016 (JP) .............................. JP2016-069082
Jul. 29, 2016 (JP) .............................. JP2016-149920

(51) Int. Cl.
H02K 7/116 (2006.01)
F16H 25/24 (2006.01)
(Continued)

(52) U.S. Cl.
CPC .......... F16H 25/2454 (2013.01); B60T 1/005
(2013.01); F16H 25/2204 (2013.01);
(Continued)

(58) Field of Classification Search
CPC .............. F16H 55/06; F16H 2055/065; F16H
25/2454; F16H 2025/2081; F16H
25/2204;
(Continued)

(56) References Cited

U.S. PATENT DOCUMENTS 9,182,021 B2 * 11/2015 Muramatsu ............ F16H 25/12
2010/0319477 A1 12/2010 Tateishi et al.
(Continued)

FOREIGN PATENT DOCUMENTS

CN 104141426 11/2014
DE 10 2009 028 569 2/2011
(Continued)

OTHER PUBLICATIONS

Machine translation of JP 2002352318 (Year: 2002).*
(Continued)

Primary Examiner — Randell J Krug
(74) Attorney, Agent, or Firm — Wenderoth, Lind &
Ponack, L.L.P.

(57) ABSTRACT

Provided is an electric actuator, including: a drive part (2);
a motion conversion mechanism part (3) configured to
convert a rotary motion from the drive part (2) into a linear
motion in an axial direction in parallel to an output shaft of
the drive part (2); and a lock mechanism part (7) configured
to prevent drive by the motion conversion mechanism part
(3). The lock mechanism part (7) includes: a rotary motor
(64); and a lock member (60), which is driven by the rotary
motor (64) so as to be brought into at least any one of a
locking state of preventing the drive by the motion conversion mechanism part (3) and an unlocking state of releasing
the locking state.

10 Claims, 15 Drawing Sheets

(51) Int. Cl.
  *B60T 1/00* (2006.01)
  *F16H 25/22* (2006.01)
  *H02K 7/06* (2006.01)
  *F16D 121/24* (2012.01)
  *F16H 25/20* (2006.01)

(52) U.S. Cl.
  CPC .............. *H02K 7/06* (2013.01); *H02K 7/116* (2013.01); *F16D 2121/24* (2013.01); *F16H 2025/2081* (2013.01)

(58) Field of Classification Search
  CPC ... F16H 2025/2087; H02K 7/06; H02K 7/116
  USPC .......................................................... 74/10
  See application file for complete search history.

(56) References Cited

U.S. PATENT DOCUMENTS

| 2012/0098368 | A1* | 4/2012 | Xiong | H02K 7/06 |
| | | | | 310/77 |
| 2013/0186717 | A1 | 7/2013 | Muramatsu et al. | |
| 2016/0131212 | A1 | 5/2016 | Yamasaki et al. | |

FOREIGN PATENT DOCUMENTS

| JP | 2002-352318 | 12/2002 | | |
| JP | 2002352318 A | * 12/2002 | ............... | B62H 3/08 |
| JP | 5243018 | 7/2013 | | |
| JP | 2015-161388 | 9/2015 | | |
| WO | 2012/053469 | 4/2012 | | |
| WO | 2014/200052 | 12/2014 | | |
| WO | WO-2014200052 A1 | * 12/2014 | ............... | H02K 7/06 |

OTHER PUBLICATIONS

Extended European Search Report dated Nov. 14, 2019 in corresponding European Patent Application No. 17774828.2.
International Search Report dated Jun. 13, 2017 in International (PCT) Application No. PCT/JP2017/012193.
Notice of Reasons for Refusal dated Apr. 7, 2020 in counterpart Japanese Patent Application No. 2016-149920 with English Translation.
International Preliminary Report on Patentability and Written Opinion of the International Searching Authority dated Oct. 2, 2018 in International (PCT) Application No. PCT/JP2017/012193.
Office Action dated Dec. 18, 2020 in corresponding Chinese Patent Application No. 201780018901.5, with English Translation of Search Report.

* cited by examiner

ELECTRIC ACTUATOR

TECHNICAL FIELD

The present invention relates to an electric actuator.

BACKGROUND ART

In recent years, electrification of automobiles and the like has been promoted for power saving and reduction in fuel consumption. For example, a system for operating an automatic transmission, a brake, a steering wheel, and the like of the automobile with use of power of an electric motor has been developed and brought to the market. As an electric actuator for use in such an application, there has been known an electric linear actuator employing a ball screw mechanism configured to convert a rotary motion of a motor into a motion in a linear direction.

Incidentally, in the ball screw mechanism, an efficiency of transmission of a driving force to an object device to be operated is very high. However, when an external force is input to the ball screw from a side of the object device to be operated, a ball screw shaft may move in an axial direction. Therefore, hitherto, there has been proposed an electric linear actuator provided with a lock mechanism in order to prevent the ball screw from being driven by a reverse input from the side of the object device to be operated.

For example, in Patent Literature 1, as illustrated in FIG. 20, there is provided a shaft 300 serving as a lock member configured to be freely engaged with and disengaged from a gear 400 configured to transmit a driving force from an electric motor 100 to a ball screw 200, and the rotation of the gear 400 is blocked through use of the shaft 300, thereby preventing drive of the ball screw 200.

CITATION LIST

Patent Literature 1: JP 5243018 B2

SUMMARY OF INVENTION

Technical Problem

Incidentally, the configuration described in Patent Literature 1 employs a solenoid as a driver configured to drive the shaft 300. However, when the solenoid is used, the solenoid comprises many large parts such as a frame and a coil. As a result, there is a problem in that a size of the electric actuator increases.

The present invention has been made in view of the above-mentioned problem, and therefore has an object to provide an electric actuator capable of achieving downsizing.

Solution to Problem

As a technical measure to attain the above-mentioned object, according to one embodiment of the present invention, there is provided an electric actuator, comprising: a drive part; a motion conversion mechanism part configured to convert a rotary motion from the drive part into a linear motion in an axial direction in parallel to an output shaft of the drive part; and a lock mechanism part configured to prevent drive by the motion conversion mechanism part, wherein the lock mechanism part comprises: a rotary motor; and a lock member, which is driven by the rotary motor so as to be brought into at least any one of a locking state of preventing the drive by the motion conversion mechanism part and an unlocking state of releasing the locking state.

In such a manner, through use of the rotary motor as a driving source configured to drive the lock mechanism part, compared to the configuration of using the solenoid as the driving source, the downsizing of the electric actuator can be achieved.

It is preferred that the lock mechanism part comprise a sliding screw device, which is configured to convert a rotary motion of the rotary motor into a linear motion, to thereby drive the lock member. Through employment of the sliding screw device in the lock mechanism part, the linear motion can be achieved with the simple configuration having a small number of parts in the configuration of employing the rotary motor as the driving source. Thus, further downsizing can be achieved.

Further, the actuator case may comprise a rotation restriction part configured to restrict a rotation of a member of the sliding screw device performing the linear motion. In such a manner, it is not required to independently provide a rotation restriction member, which is advantageous for the downsizing.

For example, the actuator case can provide the function of the rotation restriction part by fixing one of a sliding screw nut and a sliding screw shaft forming the sliding screw device to the lock member, fixing another one of the sliding screw nut and the sliding screw shaft to an output shaft of the rotary motor, forming a distal end portion side of the lock member into a flat plate shape, and forming, in the actuator case, a through hole having a rectangular cross section into which the distal end portion side of the lock member is inserted. In other words, in this case, the rotation of the lock member is restricted in the through hole through insertion of the distal end portion side of the lock member formed into the flat plate shape into the through hole formed into the rectangular shape in cross section. Thus, the rotation of the sliding screw nut or the sliding screw shaft fixed to the lock member is restricted, which enables the linear motion.

When the rotation is restricted by the lock member and the through hole as described above, it is preferred that the distal end portion side of the lock member be arranged coaxially with the output shaft of the rotary motor. With this configuration, a contact portion (rotation restriction portion) between the lock member and the through hole is close to the rotation center line of the rotary motor in the radial direction. Thus, a moment received by the rotation restriction portion is reduced, and a resistance against the linear motion of the lock member can be reduced. As a result, action performance of the lock member increases, and reliability of the electric actuator increases.

The lock mechanism part may comprise a spring, which is configured to urge the lock member in a direction that brings the lock member into the locking state, and the rotary motor may be configured to drive the lock member so that the lock member is switched to the unlocking state against an urging force of the spring when the drive part performs driving. In this case, even when power is not supplied to the rotary motor, the locking state can be maintained by the urging force of the spring.

Further, it is preferred that an engagement hole, with which the lock member is engaged, be formed in a side surface crossing an axial direction of a gear configured to transmit a driving force from the drive part to the motion conversion mechanism part. In this case, the lock member is not engaged with teeth of the gear. Thus, application of a load on the teeth through the engagement can be prevented, and reliability increases.

Moreover, it is desired that an inclination prevention part configured to prevent an inclination of the lock member in an advancing/retreating direction be provided.

In such a manner, through provision of the inclination prevention part, the inclination of the lock member can be reduced, or eliminated, and the advancing/retreating operation of the lock member can smoothly be performed. With this, certainty of the locking operation and the unlocking operation increases, and reliability increases.

For example, when the electric actuator comprises a lock sensor configured to detect advanced and retreated positions of the lock member by coming into contact with the lock member, the inclination prevention part is provided on the actuator case on a side opposite to a side on which the lock sensor comes into contact with the lock member. Then, when the lock member is advanced to move to a locking position, the lock member can be recovered from an inclined state through abutment of a surface of the lock member on the side opposite to the side on which the lock sensor comes into contact with the lock member against the inclination prevention part. In other words, even when the inclination of the lock member occurs through contact of the lock sensor with one side of the lock member, the lock member can be recovered from the inclined state through abutment of the surface of the lock member on a side opposite to the one side against the inclination prevention part.

Moreover, when the lock member comprises a distal end portion, which is inserted into and engaged with the engagement hole, and a pair of shoulder portions, which are arranged on opposite sides with respect to a straight line passing through the distal end portion in the advancing/retreating direction, and the lock sensor is arranged at a position of being capable of coming into contact with one of the shoulder portions, the inclination prevention part is provided on the actuator case so as to be opposed to the shoulder portion on an opposite side of the shoulder portion with which the lock sensor comes into contact. Through provision of the inclination prevention part at such a position, the shoulder portion on the opposite side of the shoulder portion with which the lock sensor comes into contact is brought into abutment against the inclination prevention part due to the advance of the lock member. Thus, the lock member can be recovered from the inclined state.

Moreover, when the electric actuator comprises the lock sensor configured to detect advanced and retreated positions of the lock member by coming into contact with the lock member as described above, the inclination prevention part may be provided on the lock member on the side opposite to the side on which the lock sensor comes into contact with the lock member. In this case, when the lock member is advanced to move to the locking position, the lock member can be recovered from the inclined state through abutment of the inclination prevention part against the actuator case.

Moreover, when the lock member comprises the pair of shoulder portions as described above, the inclination prevention part may be provided on the shoulder portion on the opposite side of the shoulder portion with which the lock sensor comes into contact.

Moreover, through formation of a surface of the lock member of a low-friction surface, a slide performance of the lock member with respect to peripheral members can be increased, and wear of the lock member due to interference with the peripheral members can also be suppressed.

Moreover, through provision of a tilted surface at an entrance portion of the engagement hole, the lock member can smoothly be inserted into the engagement hole along the tilted surface.

Moreover, a portion of the engagement hole of the gear may be formed of resin having a low-friction surface, and a portion of teeth of the gear may be formed of metal. With this, a slide performance of the lock member with respect to the engagement hole can be increased, and wear due to interference between the lock member and the engagement hole can also be suppressed.

Advantageous Effects of Invention

According to the present invention, an electric actuator suitable for downsizing can be provided.

DESCRIPTION OF EMBODIMENTS

Now, description is made of the present invention with reference to the accompanying drawings. In the respective drawings for illustrating the present invention, components such as members and component parts having the same functions or shapes are denoted by the same reference symbols as long as the components can be distinguished, and description thereof is therefore omitted after the description is made once.

Figure 1:
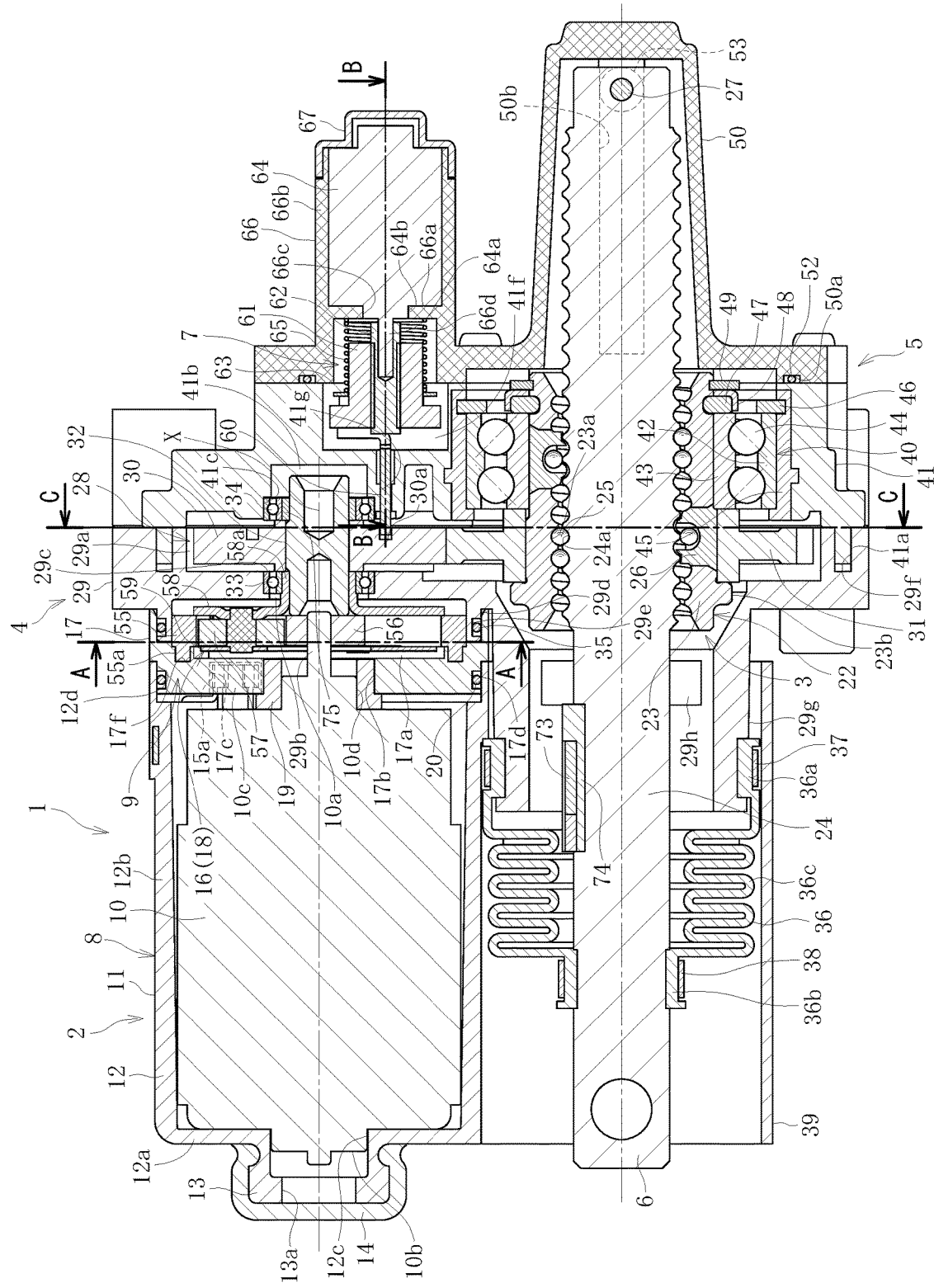
FIG. 1 is a vertical sectional view of an electric actuator according to one embodiment of the present invention.
Figure 2:
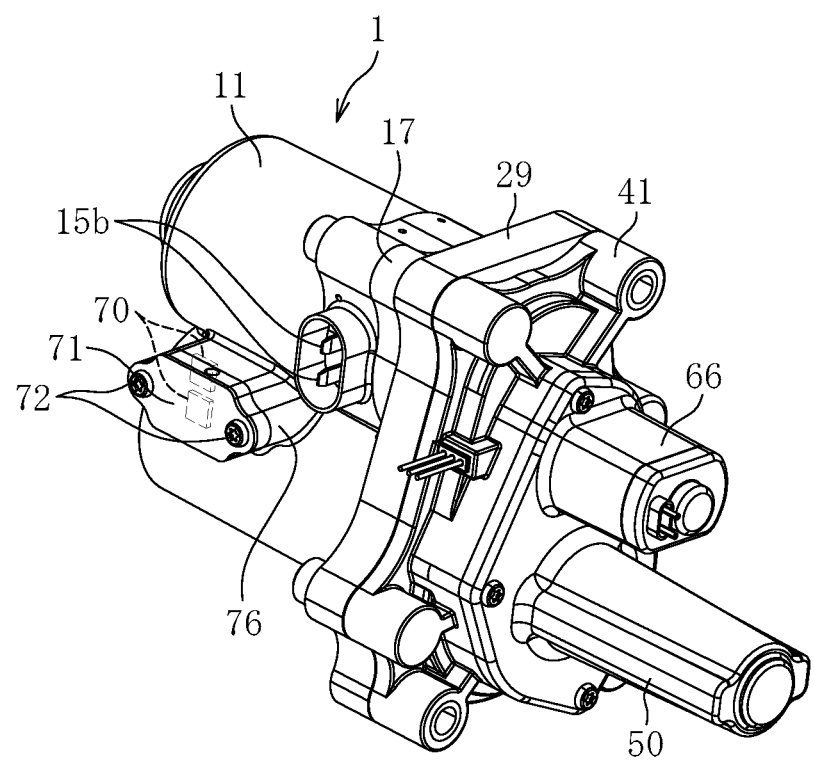
FIG. 2 is an external perspective view of the electric actuator.
Figure 3:
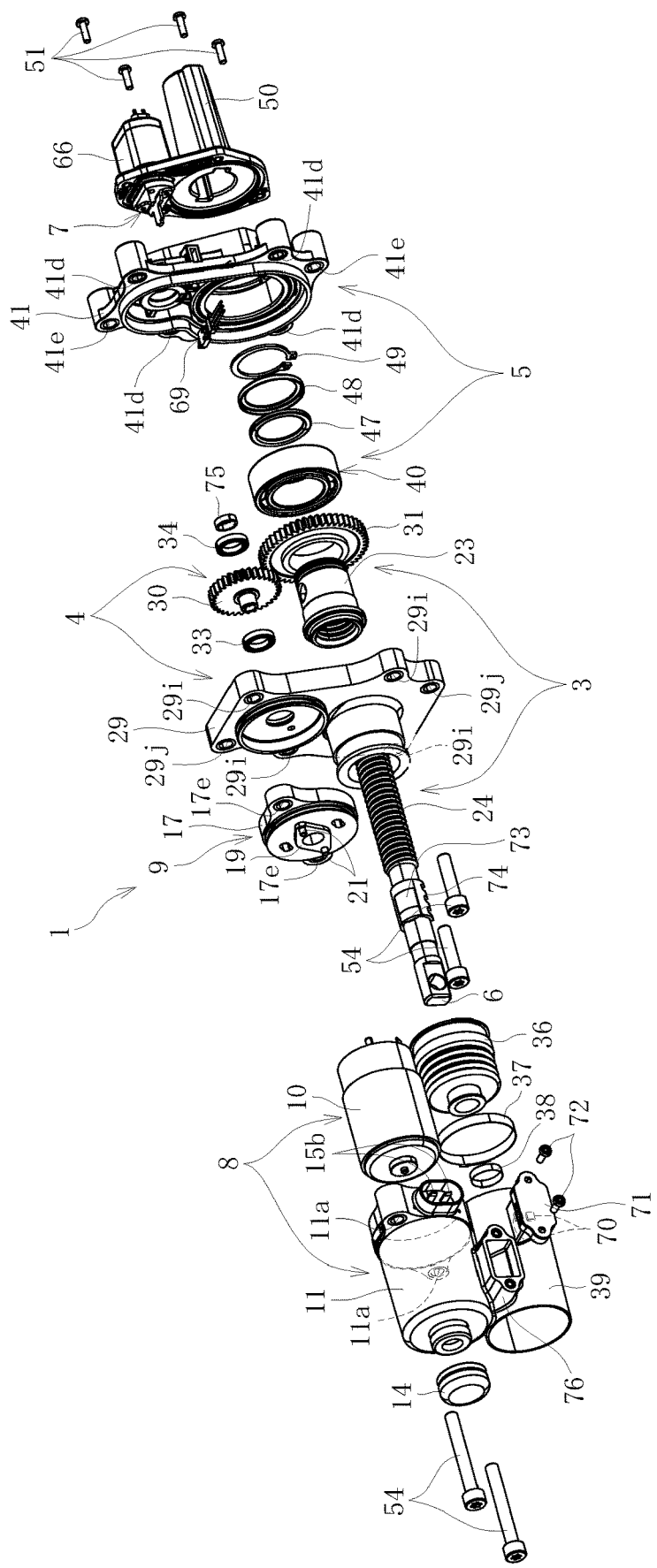
FIG. 3 is an exploded perspective view of the electric actuator.

FIG. 1 is a vertical sectional view for illustrating an assembled state of an electric actuator according to one embodiment of the present invention. FIG. 2 is an external perspective view for illustrating the assembled state of the electric actuator. FIG. 3 is an exploded perspective view of the electric actuator.

As illustrated in FIG. 1, an electric actuator 1 of this embodiment mainly comprises a drive part 2, a motion conversion mechanism part 3, a driving force transmission part 4, a motion-conversion-mechanism support part 5, an operation part 6, and a lock mechanism part 7. The drive part 2 is configured to generate a driving force. The motion conversion mechanism part 3 is configured to convert a rotary motion from the drive part 2 into a linear motion. The driving force transmission part 4 is configured to transmit the driving force from the drive part 2 to the motion conversion mechanism part 3. The motion-conversion-mechanism support part 5 is configured to support the motion conversion mechanism part 3. The operation part 6 is configured to output the motion of the motion conversion mechanism part 3. The lock mechanism part 7 is configured to prevent the motion conversion mechanism part 3 from driving. Moreover, the drive part 2 comprises a motor part 8 and a speed reduction mechanism part 9.

Each of the parts forming the electric actuator 1 has a case. Component parts are accommodated in each of the cases. Specifically, the motor part 8 comprises a motor case 11 configured to accommodate a driving motor 10. The speed reduction mechanism part 9 comprises a speed reduction gear case 17 configured to accommodate a speed reduction gear mechanism 16. Moreover, the driving force transmission part 4 comprises a transmission gear case 29 configured to accommodate a transmission gear mechanism 28. The motion-conversion-mechanism support part 5 comprises a bearing case 41 configured to accommodate a support bearing 40. Further, respective pairs of the motor part 8 and the speed reduction mechanism part 9, the speed reduction mechanism part 9 and the driving force transmission part 4, and the driving force transmission part 4 and the motion-conversion-mechanism support part 5 are configured to be capable of being coupled to and decoupled from one another while the pairs are accommodated in the cases. Further, a shaft case 50 is configured to be capable of being coupled to and decoupled from the bearing case 41. Now, description is made of detailed configurations of the respective parts forming the electric actuator 1.

The motor part 8 mainly comprises the driving motor (DC motor) 10 and the motor case 11. The driving motor 10 is configured to drive the motion conversion mechanism part 3. The motor case 11 is configured to accommodate the driving motor 10. The motor case 11 comprises a case main body 12 and a projecting portion 13. The case main body 12 has a bottomed cylindrical shape, and is configured to accommodate the driving motor 10 therein. The projecting portion 13 projects from a bottom portion 12a of the case main body 12 to the outside. The projecting portion 13 has a hole portion 13a which communicates to an internal space of the case main body 12. The hole portion 13a is sealed by a seal member 14 that is made of resin and covers an outer surface of the projecting portion 13.

Under a state in which the driving motor 10 is inserted from an opening portion 12d of the case main body 12 into an inside of the case main body 12, an end surface of the driving motor 10 on an inner side in an insertion direction is held in abutment against the bottom portion 12a of the case main body 12. Moreover, a fitting hole 12c is formed in a center portion of the bottom portion 12a. A projection 10b of the driving motor 10 in the inner side in the insertion direction is fitted to the fitting hole 12c, thereby preventing interference of a rear end (left end portion in FIG. 1) of an output shaft 10a projecting from the projection 10b with the bottom portion 12a of the motor case 11. Further, an inner peripheral surface of a peripheral wall portion 12b of the case main body 12 is reduced in diameter in a tapered shape from the opening portion 12d side toward the bottom portion 12a side. When the driving motor 10 is inserted into the case main body 12, an outer peripheral surface of the driving motor 10 on the inner side in the insertion direction comes into contact with the inner peripheral surface of the peripheral wall portion 12b. With this configuration, the driving motor 10 is supported through the contact with the inner peripheral surface of the case main body 12 and the fitting to the fitting hole 12c under the state in which the driving motor 10 is inserted into the case main body 12.

Figure 4:
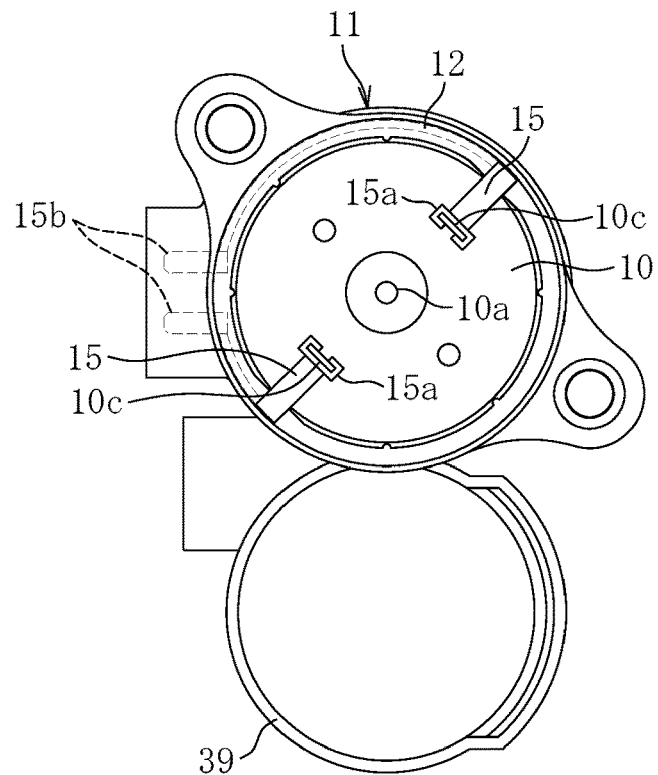
FIG. 4 is a view of a motor case as seen from an opening portion side.

Moreover, as illustrated in FIG. 4, which is a view of the motor case 11 as seen from the opening portion 12d side, a pair of bus bars 15 configured to connect the driving motor 10 to a power supply is mounted to the case main body 12. One end portion 15a of each of the bus bars 15 is connected to a motor terminal 10c through crimping, and another end portion 15b is exposed from the case main body 12 to the outside (see FIG. 2 and FIG. 3). The end portions 15b of the bus bars 15 exposed to the outside are connected to the power supply.

Next, description is made of the speed reduction mechanism part 9.

As illustrated in FIG. 1, the speed reduction mechanism part 9 mainly comprises the speed reduction gear mechanism 16 and the speed reduction gear case 17. The speed reduction gear mechanism 16 is configured to reduce the speed of the driving force of the driving motor 10 and output the driving force. The speed reduction gear case 17 is configured to accommodate the speed reduction gear mechanism 16. The speed reduction gear mechanism 16 is formed of a planetary-gear speed reduction mechanism 18 comprising a plurality of gears and the like. A detailed configuration of the planetary-gear speed reduction mechanism 18 is described later.

The speed reduction gear case 17 has an accommodating recessed portion 17a configured to accommodate the planetary-gear speed reduction mechanism 18 from an opposite side of the driving motor 10. Moreover, the speed reduction gear case 17 is formed so as to enable a motor adaptor 19 serving as a motor mounting member to be mounted thereto. The motor adaptor 19 is a tubular member, and a projection 10d of the driving motor 10 on an output side (right side in FIG. 1) is inserted into and fitted to an inner peripheral surface of the motor adaptor 19. The speed reduction gear case 17 has a fitting hole 17b to which the motor adaptor 19 is fitted. The motor adaptor 19 is inserted from the driving motor 10 side into the fitting hole 17b and mounted to the fitting hole 17b.

The speed reduction gear case 17 is configured to be capable of being fitted to the motor case 11 and the transmission gear case 29 described later and arranged on the opposite side of the motor case 11. A portion of the speed reduction gear case 17 arranged on the motor case 11 side is internally fitted to the opening portion 12d side of the motor case 11. A portion of the speed reduction gear case 17 arranged on the transmission gear case 29 side is externally fitted to the transmission gear case 29. Moreover, the speed reduction gear case 17 is fastened to the driving motor 10 through bolts 21 (see FIG. 3 and FIG. 6) together with the motor adaptor 19 while being fitted to the motor case 11. On the driving motor 10 side of the speed reduction gear case 17, there are formed recessed portions 17c configured to prevent interference with the motor terminals 10c projecting from the driving motor 10 and with the end portions 15a of the bus bars 15 crimped to the motor terminals 10c while the speed reduction gear case 17 and the motor case 11 are fitted to each other. Moreover, a mounting groove 17d configured to mount an O ring 20 is formed in an outer peripheral surface (fitting surface) of the speed reduction gear case 17 to be fitted to an inner peripheral surface of the motor case 11.

Next, description is made of the motion conversion mechanism part 3.

The motion conversion mechanism part 3 is formed of a ball screw 22. The ball screw 22 mainly comprises a ball screw nut 23, a ball screw shaft 24, a large number of balls 25, and deflectors 26. The ball screw nut 23 serves as a rotary body. The ball screw shaft 24 is a shaft portion performing a linear motion. The deflectors 26 serve as circulation members. Spiral grooves 23a and 24a are respectively formed in an inner peripheral surface of the ball screw nut 23 and an outer peripheral surface of the ball screw shaft 24. The balls 25 are loaded between both of the spiral grooves 23a and 24a, and the deflectors 26 are assembled therebetween. With this configuration, the balls 25 in two rows circulate.

The ball screw nut 23 receives the driving force from the driving motor 10, to thereby rotate in a forward direction or a backward direction. Meanwhile, the rotation of the ball screw shaft 24 is restricted by a pin 27 that is provided on a rear end portion (right end portion in FIG. 1) thereof and serves as a rotation restriction member. Therefore, when the ball screw nut 23 rotates, the balls 25 circulate along both the spiral grooves 23a and 24a and the deflectors 26, and the ball screw shaft 24 advances and retreats in the axial direction. FIG. 1 is a view for illustrating a state in which the ball screw shaft 24 is arranged at an initial position given when the ball screw shaft 24 retreats most to the right side of FIG. 1. Moreover, the ball screw shaft 24 is arranged in parallel to the output shaft 10a of the driving motor 10. The rotary motion from the driving motor 10 is converted into a linear motion in the axial direction parallel to the output shaft 10a by the ball screw shaft 24. A distal end portion (left end portion in FIG. 1) of the ball screw shaft 24 in an advancing direction functions as the operation part (actuator head) 6 configured to operate an object device to be operated Next, description is made of the driving force transmission part 4.

The driving force transmission part 4 mainly comprises the transmission gear mechanism 28 and the transmission gear case 29. The transmission gear mechanism 28 is configured to transmit the driving force from the driving motor 10 of the drive part 2 to the ball screw 22 being the motion conversion mechanism part 3. The transmission gear case 29 is configured to accommodate the transmission gear mechanism 28. The transmission gear mechanism 28 comprises a drive gear 30 as a first gear on a drive side and a driven gear 31 as a second gear on a driven side meshing with the drive gear 30.

A gear boss 32 is press-fitted to a rotation center portion of the drive gear 30. The drive gear 30 is rotatably supported through intermediation of the gear boss 32 by two rolling bearings 33 and 34 mounted to both the transmission gear case 29 and the bearing case 41 described later. Meanwhile, the driven gear 31 is press-fitted and fixed to the outer peripheral surface of the ball screw nut 23. When the driving force from the driving motor 10 is transmitted to the drive gear 30 through intermediation of the planetary-gear speed reduction mechanism 18, the driven gear 31 and the ball screw nut 23 integrally rotate, and the ball screw shaft 24 advances and retreats.

The transmission gear case 29 comprises an accommodating recessed portion 29a configured to accommodate the drive gear 30 and the driven gear 31 therein. Moreover, the transmission gear case 29 has an insertion hole 29b through which the gear boss 32 is inserted. On an inner peripheral surface of the insertion hole 29b, there is formed a bearing mounting surface 29c to which the one rolling bearing 33 configured to support the gear boss 32 is mounted. Moreover, the transmission gear case 29 comprises an annular projection 29d fitted to an inner peripheral surface of the speed reduction gear case 17. In an outer peripheral surface (fitting surface) of the annular projection 29d, there is formed a mounting groove 29e configured to mount an O ring 35. Moreover, in a surface of the transmission gear case 29 on the bearing case 41 side, there is formed a fitting recessed portion 29f in a groove form fitted to the bearing case 41.

Moreover, the transmission gear case 29 comprises a cylindrical portion 29g projecting toward a distal end portion side (left side in FIG. 1) of the ball screw shaft 24. The cylindrical portion 29g is a portion arranged so as to cover a periphery of the ball screw shaft 24 under a state in which the driven gear 31 is accommodated in the transmission gear case 29, and the ball screw 22 is assembled to the driven gear 31. A boot 36 configured to prevent foreign substances from entering the transmission gear case 29 is mounted between the cylindrical portion 29g and the ball screw shaft 24. The boot 36 comprises a large-diameter end portion 36a, a small-diameter end portion 36b, and a bellows portion 36c, which connects the large-diameter end portion 36a and the small-diameter end portion 36b to each other, and expands and contracts in the axial direction. The large-diameter end portion 36a is fixed to a mounting portion of an outer peripheral surface of the cylindrical portion 29g by tightening a boot band 37. The small-diameter end portion 36b is fixed to a mounting portion of the outer peripheral surface of the ball screw shaft 24 by tightening a boot band 38. Moreover, the cylindrical portion 29g has a vent hole 29h which is configured to cause the air to communicate between an inside and an outside of the boot 36 when the boot 36 expands and contracts. Moreover, a boot cover 39 arranged around the boot 36 is provided integrally with the motor case 11.

Next, description is made of the motion-conversion-mechanism support part 5.

The motion-conversion-mechanism support part 5 mainly comprises the support bearing 40 and the bearing case 41. The support bearing 40 is configured to support the ball screw 22 being the motion conversion mechanism part 3. The bearing case 41 is configured to accommodate the support bearing 40. The support bearing 40 is formed of a back-to-back double-row angular contact ball bearing comprising an outer ring 42, an inner ring 43, and balls 44 in a plurality of rows interposed therebetween as main components.

The support bearing 40 is accommodated in a sleeve 45 formed integrally with the bearing case 41, and is fixed through a snap ring 46 mounted to an inner peripheral surface of the sleeve 45. Moreover, the support bearing 40 is fixed by being press-fitted to an outer peripheral surface of the ball screw nut 23 on a rear end side (right side in FIG. 1) of the ball screw shaft 24 with respect to the driven gear 31. A movement in the axial direction of the support bearing 40 and the driven gear 31 fixed to the outer peripheral surface of the ball screw nut 23 is restricted by a restriction projection 23b formed on the ball screw nut 23 on the driven gear 31 side and a restriction member 47 mounted on the support bearing 40 side. The restriction member 47 comprises a pair of semicircular members, and is mounted to the outer peripheral surface of the ball screw nut 23 while the semicircular members are combined in an annular form. Further, a pressing collar 48 and a snap ring 49 are mounted to the outer peripheral surface of the ball screw nut 23. The pressing collar 48 is configured to hold the restriction member 47. The snap ring 49 is configured to prevent the pressing collar 48 from falling off in the axial direction.

On the transmission gear case 29 side of the bearing case 41, there is formed a protruding portion 41a configured to be fitted to the fitting recessed portion 29f of the transmission gear case 29. Moreover, on the transmission gear case 29 side of the bearing case 41, there is formed a gear boss accommodating portion 41b configured to accommodate a part of the gear boss 32 projecting from the transmission gear case 29 under a state in which the bearing case 41 is fitted to the transmission gear case 29. On an inner peripheral surface of the gear boss accommodating portion 41b, there is formed a bearing mounting surface 41c which is configured to mount the rolling bearing 34 configured to support the gear boss 32.

On an opposite side of the bearing case 41 with respect to the transmission gear case 29 side, the shaft case 50 having a bottomed tubular shape configured to accommodate a rear end portion side (right end portion side in FIG. 1) of the ball screw shaft 24 is formed so as to be capable of being fastened through bolts 51 (see FIG. 3). In an abutment surface of the shaft case 50 against the bearing case 41, there is formed a mounting groove 50a configured to mount an O ring 52. Moreover, in an inner peripheral surface of the shaft case 50, guide grooves 50b into which both end portions of the pin 27 provided on the ball screw shaft 24 are formed so as to extend in the axial direction. A guide collar 53 is rotatably mounted to each of the both end portions of the pin 27. When the ball screw shaft 24 advances and retreats in the axial direction, the guide collars 53 move along the guide grooves 50b while rotating.

As illustrated in FIG. 3, bolt insertion holes 11a, 17e, 29i, and 41d for inserting bolts 54 configured to assemble and fasten the motor case 11, the speed reduction gear case 17, the transmission gear case 29, and the bearing case 41 are formed in outer peripheries of the respective cases in a radial direction. Further, through holes 29j and 41e configured to mount the assembled electric actuator 1 to an installation location are formed in the outer peripheries in the radial direction of both of the transmission gear case 29 and the bearing case 41.

Figure 5:
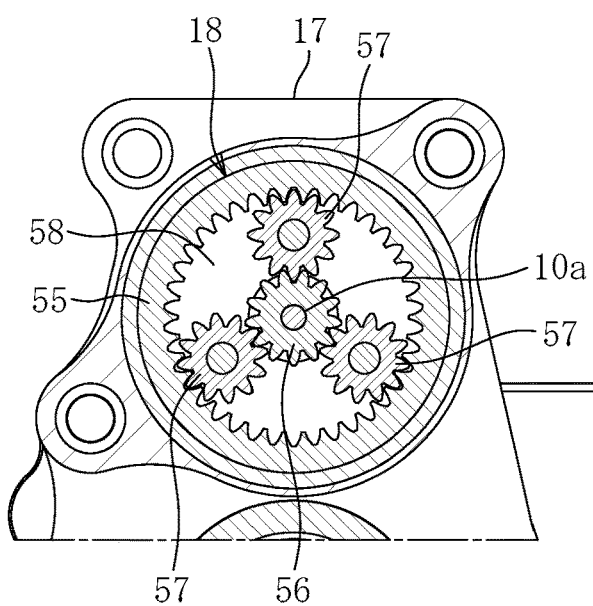
FIG. 5 is a transverse sectional view as seen in a direction indicated by the arrows of the line A-A in FIG. 1.
Figure 6:
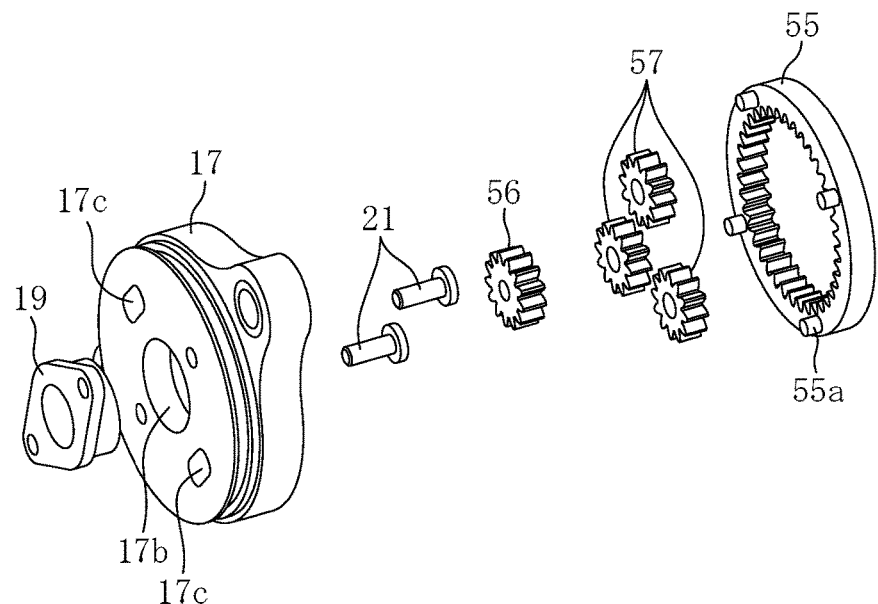
FIG. 6 is an exploded perspective view of a speed reduction mechanism part.

Now, description is made of the planetary-gear speed reduction mechanism 18 with reference to FIG. 1, FIG. 5, and FIG. 6.

FIG. 5 is a transverse sectional view as seen in a direction indicated by the arrows of the line A-A in FIG. 1. FIG. 6 is an exploded perspective view of the planetary-gear speed reduction mechanism 18.

The planetary-gear speed reduction mechanism 18 comprises a ring gear 55, a sun gear 56, a plurality of planetary gears 57, a planetary gear carrier 58 (see FIG. 1), and planetary gear holders 59 (see FIG. 1). The ring gear 55 comprises a plurality of protrusions 55a projecting in the axial direction. Engagement recessed portions 17f as many as the protrusions 55a are formed in the accommodating recessed portion 17a of the speed reduction gear case 17 (see FIG. 1). Through assembly of the protrusions 55a of the ring gear 55 to the engagement recessed portions 17f of the speed reduction gear case 17 while the protrusions 55a and the engagement recessed portions 17f are in phase, the ring gear 55 is accommodated in the speed reduction gear case 17 while the rotation of the ring gear 55 is stopped.

The sun gear 56 is arranged at the center of the ring gear 55. The output shaft 10a of the driving motor 10 is press-fitted to the sun gear 56. Moreover, the respective planetary gears 57 are arranged between the ring gear 55 and the sun gear 56 so as to mesh with the ring gear 55 and the sun gear 56. The respective planetary gears 57 are rotatably supported by the planetary gear carrier 58 and the planetary gear holders 59. The planetary gear carrier 58 comprises a cylindrical portion 58a at its center portion. The cylindrical portion 58a is press-fitted between an outer peripheral surface of the gear boss 32 and an inner peripheral surface of the rolling bearing 33 (see FIG. 1). An annular collar 75 is mounted between an inner peripheral surface of the another rolling bearing 34 and the outer peripheral surface of the gear boss 32.

In the planetary-gear speed reduction mechanism 18 having the configuration described above, when the driving motor 10 performs the rotational drive, the sun gear 56 coupled to the output shaft 10a of the driving motor 10 rotates, and, along with this rotation, the respective planetary gears 57 revolve along the ring gear 55 while rotating. Then, the planetary gear carrier 58 is rotated by the revolving motion of the planetary gears 57. With this, the rotation of the driving motor 10 is reduced in speed and transmitted to the drive gear 30, and a rotation torque increases. When the driving force is transmitted through the planetary-gear speed reduction mechanism 18 in such a manner, a high output of the ball screw shaft 24 can be obtained, and the driving motor 10 can be downsized.

Figure 7:
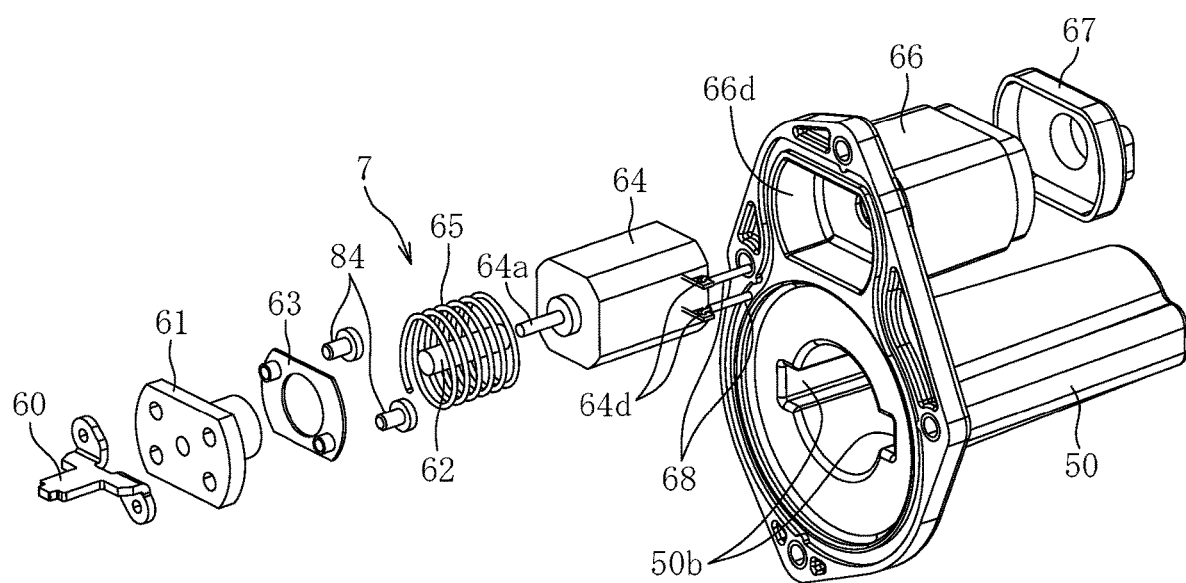
FIG. 7 is an exploded perspective view of a shaft case and a lock mechanism part mounted thereto.
Figure 8:
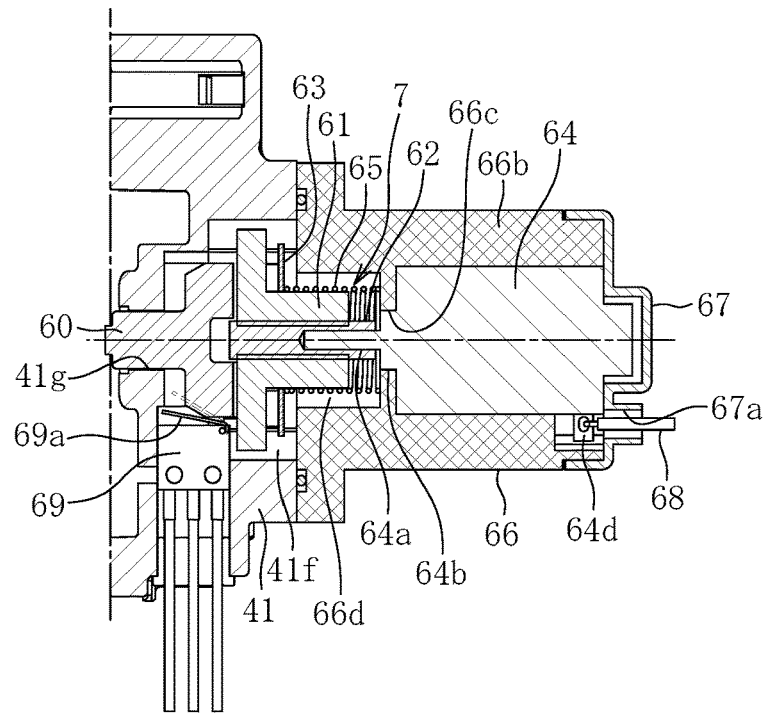
FIG. 8 is a transverse sectional view as seen in a direction indicated by the arrows of the line B-B in FIG. 1.

Next, description is made of the lock mechanism part 7 with reference to FIG. 1, FIG. 7, and FIG. 8. FIG. 7 is an exploded perspective view of the shaft case 50 and the lock mechanism part 7 mounted thereto. FIG. 8 is a transverse sectional view as seen in a direction indicated by the arrows of the line B-B in FIG. 1.

The lock mechanism part 7 mainly comprises a lock member 60, a sliding screw nut 61, a sliding screw shaft 62, a lock-member fixation plate 63, a locking motor (DC motor) 64, and a spring 65. When the lock mechanism part 7 is to be assembled, first, the lock member 60 is fastened to the sliding screw nut 61 through intermediation of the lock-member fixation plate 63 with bolts 84 (see FIG. 7). Next, the locking motor 64 is accommodated in a holder portion 66 formed in the shaft case 50. The sliding screw shaft 62 is then mounted to an output shaft 64a of the locking motor 64 projecting from the holder portion 66. Then, the spring 65 is arranged on an outer periphery of the sliding screw shaft 62, and the sliding screw nut 61 having the lock member 60 mounted thereto is mounted to the sliding screw shaft 62 through thread engagement. In such a manner, assembly of the lock mechanism part 7 is completed.

The holder portion 66 is formed into a bottomed tubular shape, and a cap 67 is mounted on an opposite side of a bottom portion 66a thereof. The locking motor 64 is held in abutment against the bottom portion 66a of the holder portion 66 and an inner surface of the cap 67 under a state in which the locking motor 64 is inserted into the holder portion 66 and the cap 67 is mounted. Moreover, under this state, a projection 64b of the locking motor 64 on an output side (left side in FIG. 1) is fitted to a fitting hole 66c formed in the bottom portion 66a of the holder portion 66. Both of an outer peripheral surface of the main body of the locking motor 64 and an inner peripheral surface of a peripheral wall portion 66b of the holder portion 66 are formed into the same shapes, which are not cylindrical. Thus, the rotation of the locking motor 64 is restricted through the insertion of the locking motor 64 into the peripheral wall portion 66b of the holder portion 66. Through accommodation of the locking motor 64 in the holder portion 66 in such a manner, the locking motor 64 is held by the holder portion 66, and the entire lock mechanism part 7 is held. Moreover, the cap 67 has a hole portion 67a configured to insert cables 68 connected to motor terminals 64d of the locking motor 64 (see FIG. 8).

Figure 9:
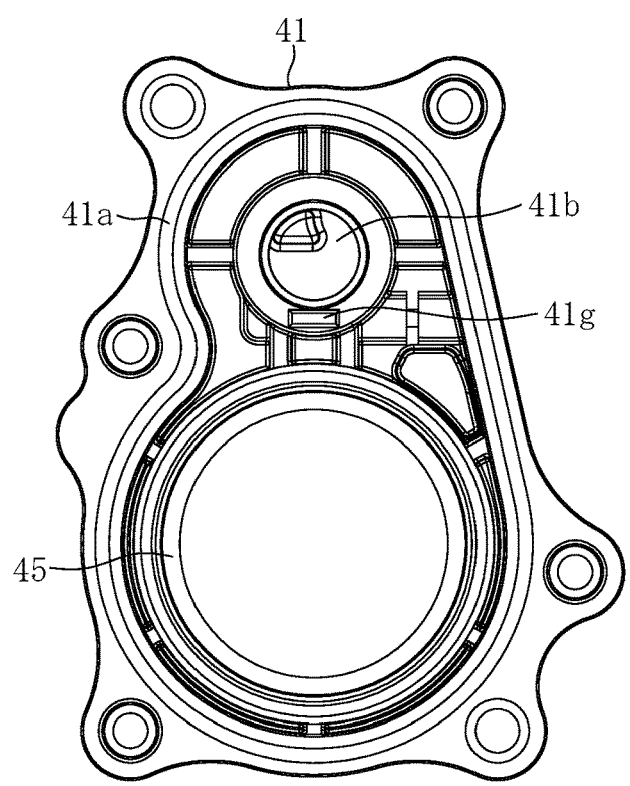
FIG. 9 is a front view of a bearing case as seen from the left side of FIG. 1.
Figure 10:
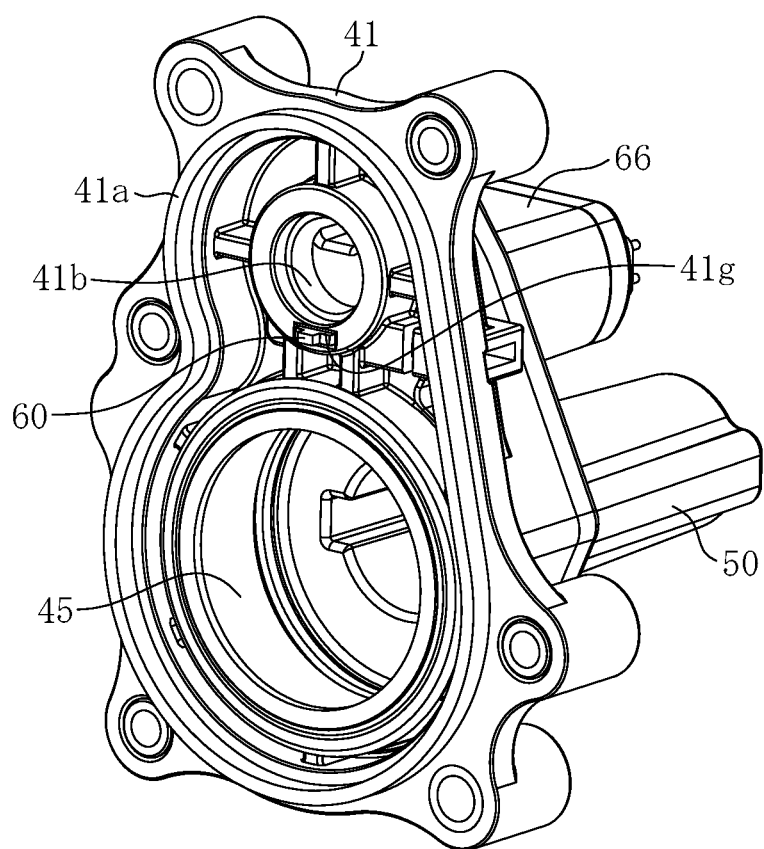
FIG. 10 is a perspective view for illustrating a state in which a distal end portion of a lock member projects from a through hole.

Lock-mechanism accommodating recessed portions 66d and 41f are respectively formed in a portion of the shaft case 50 at which the holder portion 66 is formed and a portion of the bearing case 41 opposed thereto. A through hole 41g is formed in the lock-mechanism accommodating recessed portion 41f on the bearing case 41 side. As illustrated in FIG. 1, a part of the output shaft 64a of the locking motor 64, the sliding screw shaft 62, the sliding screw nut 61, the lock-member fixation plate 63, the spring 65, and the lock member 60, which project from the holder portion 66, are accommodated in the lock-mechanism accommodating recessed portions 66d and 41f, and a distal end portion side of the lock member 60 having a flat plate shape is inserted into the through hole 41g under a state in which the shaft case 50 is mounted to the bearing case 41. The through hole 41g is formed of a hole having a rectangular cross section approximately the same in size and the same in shape as the distal end portion side of the lock member 60 (see FIG. 9 and FIG. 10). Moreover, the spring 65 is compressed in the axial direction between the bottom portion 66a of the holder portion 66 and the lock-member fixation plate 63 under the state in which the shaft case 50 is mounted to the bearing case 41. The lock member 60 is always urged in an advancing direction (left side in FIG. 1) by the compressed spring 65.

Figure 11:
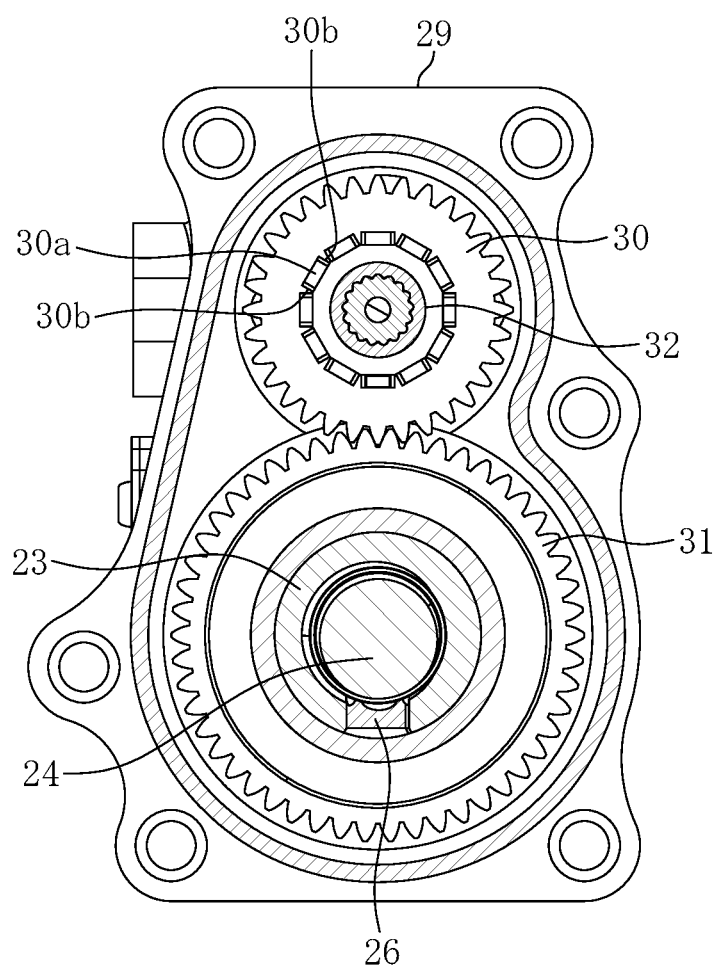
FIG. 11 is a transverse sectional view as seen in a direction indicated by the arrows of the line C-C in FIG. 1.

The drive gear 30 is arranged in the advancing direction of the lock member 60. The drive gear 30 has engagement holes 30a with which the distal end portion of the lock member 60 can be engaged. As illustrated in FIG. 11, which is a transverse sectional view as seen in a direction indicated by the arrows of the line C-C in FIG. 1, the plurality of engagement holes 30a are formed in a circumferential direction of the drive gear 30. The rotation of the drive gear 30 is restricted through the engagement of the lock member 60 with any one of those engagement holes 30a. Moreover, a tilted surface 30b is formed at an entrance portion of each of the engagement holes 30a, and the lock member 60 is thus smoothly inserted into the engagement hole 30a along the tilted surface 30b.

A lock sensor 69 configured to detect a locking state is mounted to the bearing case 41 (see FIG. 8). The lock sensor 69 comprises a contact element 69a formed of an elastic member such as a plate spring. When the lock member 60 advances to be engaged with the engagement hole 30a (brought into a locking state), the lock member 60 pushes the contact element 69a so that the lock sensor 69 detects the locking state.

Now, description is made of an operation of the lock mechanism part 7.

When power is not supplied to the locking motor 64, the lock member 60 is held at the advanced position by the spring 65, and is in the locking state in which the distal end portion of the lock member 60 is engaged with the engagement hole 30a of the drive gear 30. When the power is supplied to the driving motor 10 in order to start the driving of the ball screw shaft 24 in this state, the power is also supplied to the locking motor 64, and the locking motor 64 drives the lock member 60 in a retreating direction. With this, the sliding screw shaft 62 rotates. Meanwhile, the rotation of the sliding screw nut 61 is restricted through the insertion of the flat-plate-shaped distal end portion of the lock member 60 into the through hole 41g having a rectangular cross section. Thus, when the sliding screw shaft 62 rotates, the sliding screw nut 61 retreats against the urging force of the spring 65, and the lock member 60 retreats integrally with the sliding screw nut 61. With this, the distal end portion of the lock member 60 is disengaged from the engagement hole 30a of the drive gear 30, and the locking state is thus released. In this way, while the ball screw shaft 24 is being driven, the lock member 60 is held at the retreated position, and the drive gear 30 is thus held in the unlocked state (unlocking state).

After that, when the supply of power to the driving motor 10 is shut off and the drive of the ball screw shaft 24 is thus stopped, the supply of power to the locking motor 64 is also shut off. With this, the driving force for causing the lock member 60 to retreat is no longer generated, and the lock member 60 is thus pushed to move in the advancing direction by the spring 65. Then, the locking state is brought about through the engagement of the distal end portion of the lock member 60 with the engagement hole 30a of the drive gear 30, thereby restricting the rotation of the drive gear 30.

Through restriction of the rotation of the drive gear 30 by the lock member 60 in such a manner, the ball screw shaft 24 is held in the state in which the ball screw shaft 24 does not retreat. With this, even when an external force is input from the object device to be operated to the ball screw shaft 24 side, a position of the ball screw shaft 24 can be held at a predetermined position. This configuration is particularly preferred for a case in which the electric actuator is applied to an application that requires holding a position of the ball screw shaft 24.

In this embodiment, the lock member 60 is caused to retreat by driving the locking motor 64. Conversely, the locking motor 64 may be driven to cause the lock member 60 to advance. Moreover, the lock member 60 may be caused to advance and retreat by rotating the locking motor 64 forward and backward.

A stroke sensor 70 configured to detect a stroke of the ball screw shaft 24 is mounted to the electric actuator 1 of this embodiment (see FIG. 2 and FIG. 3). The stroke sensor 70 is mounted to a sensor base 71. The sensor base 71 is fastened and fixed through bolts 72 to a sensor case 76 formed on an outer peripheral surface between the motor case 11 and the boot cover 39. Meanwhile, a permanent magnet 73 serving as a sensor target is mounted to an outer peripheral surface of a portion of the ball screw shaft 24 covered with the boot 36 (see FIG. 1). In this embodiment, the permanent magnet 73 is mounted to the ball screw shaft 24 through intermediation of a cylindrical elastic member 74 cut apart at a portion in a circumferential direction. When the ball screw shaft 24 advances and retreats, a position of the magnet 73 with respect to the stroke sensor 70 changes, and the position of the ball screw shaft 24 in the axial direction can be recognized through the stroke sensor 70 detecting a change in direction of line of magnetic force that changes along with the change in position of the magnet 73.

Figure 12:
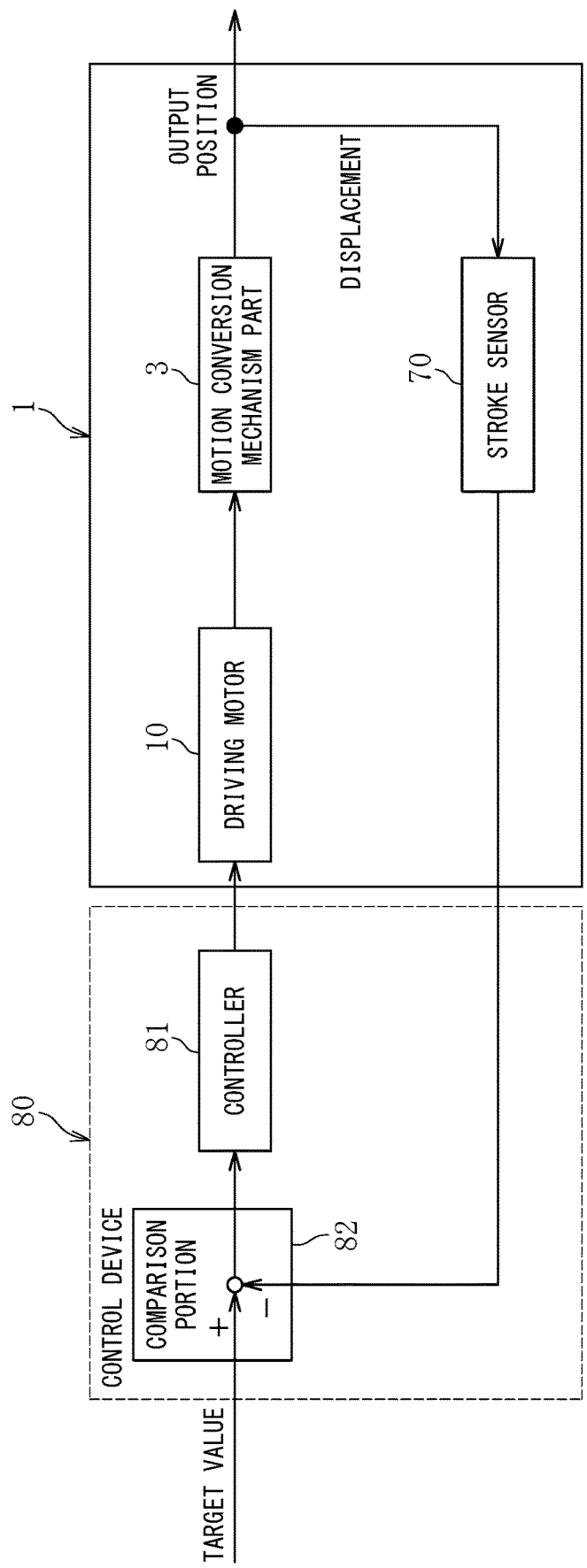
FIG. 12 is a control block diagram of the electric actuator.

Next, with reference to FIG. 12, description is made of feedback control using the stroke sensor 70.

As illustrated in FIG. 12, when a target value is transmitted to a control device 80, a control signal is transmitted from a controller 81 of the control device 80 to the driving motor 10. The target value is, for example, a stroke value calculated by an ECU provided at an upper position of a vehicle based on an operation amount when the operation amount is input to the ECU.

When the driving motor 10 receives the control signal, the driving motor 10 starts the rotational drive, and the driving force thereof is transmitted to the ball screw shaft 24 through intermediation of the planetary-gear speed reduction mechanism 18, the drive gear 30, the driven gear 31, and the ball screw nut 23, and the ball screw shaft 24 thus advances. With this, the object device to be operated arranged on the distal end portion side (actuator head side) of the ball screw shaft 24 is operated.

At this time, the stroke value (position in the axial direction) of the ball screw shaft 24 is detected by the stroke sensor 70. The detection value detected by the stroke sensor 70 is transmitted to a comparison portion 82 of the control device 80, and a difference between the detection value and the target value is calculated. Then, the driving motor 10 is driven until the detection value matches the target value. When the electric actuator 1 of this embodiment is applied to, for example, a shift-by-wire system, a shift position can reliably be controlled by feeding back the stroke value detected by the stroke sensor 70 to control the position of the ball screw shaft 24 in such a manner.

Figure 13:
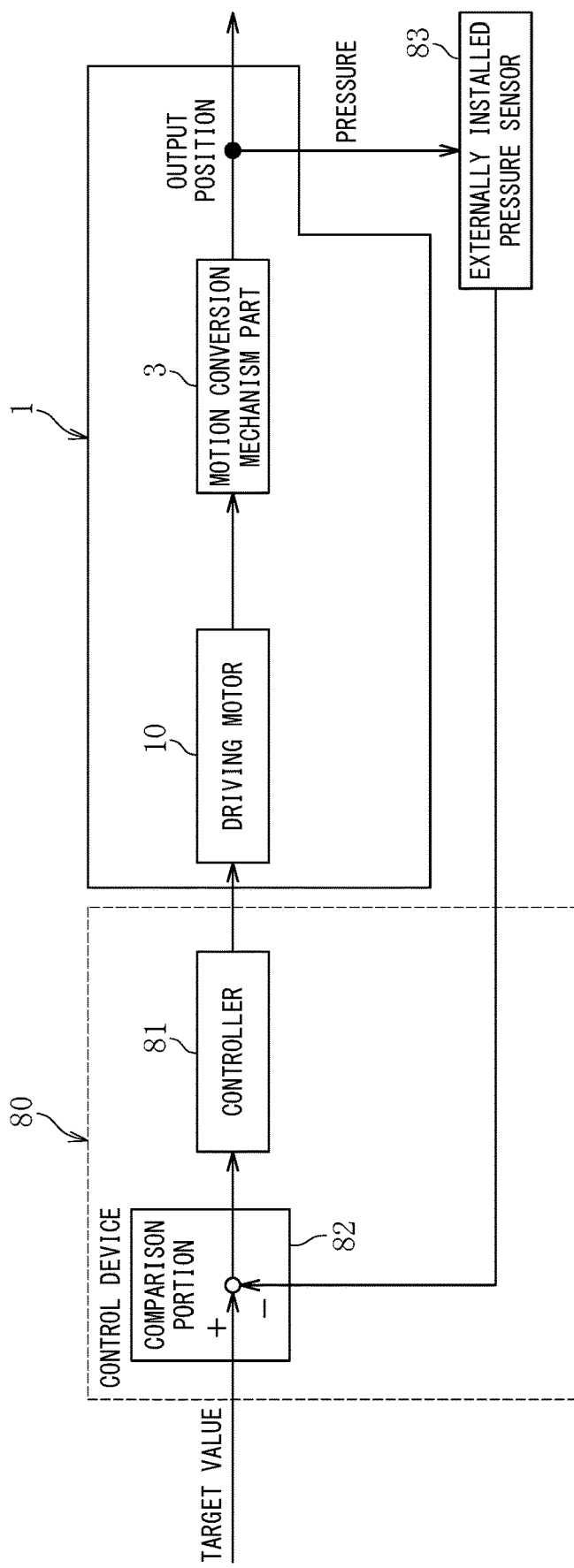
FIG. 13 is a control block diagram of the electric actuator.

Next, with reference to FIG. 13, description is made of feedback control in a case in which a pressure sensor 83 is used in place of the stroke sensor 70.

As illustrated in FIG. 13, in this case, the pressure sensor 83 is provided for the object device to be operated. When the operation amount is input to the ECU provided at the upper position of the vehicle, the ECU calculates a required target value (pressure command value). When the target value is transmitted to the control device 80, and the control signal is transmitted from the controller 81 to the driving motor 10, the driving motor 10 starts the rotational drive. With this, the ball screw shaft 24 advances, and the object device to be operated arranged on the distal end portion side (actuator head side) of the ball screw shaft 24 is operated to pressurize.

An operation pressure of the ball screw shaft 24 at this time is detected by the pressure sensor 83, and the position of the ball screw shaft 24 is subjected to the feedback control based on the detection value and the target value as in the case of the use of the stroke sensor 70. When the electric actuator 1 of this embodiment is applied to, for example, a brake-by-wire system, a hydraulic pressure of a brake can reliably be controlled by feeding back the pressure value detected by the pressure sensor 83 to control the position of the ball screw shaft 24 in such a manner.

The configuration and the operation of the electric actuator 1 of this embodiment are as described above. Now, description is made of components suitable for downsizing relating to the electric actuator 1 of this embodiment.

As mentioned in the description of the lock mechanism part 7, in this embodiment, the locking motor 64 of the rotary type is used as the driving source configured to drive the lock mechanism part 7. In such a manner, through use of the rotary motor as the driving source configured to drive the lock mechanism part 7, compared to the configuration of using a solenoid as the driving source, the downsizing of the electric actuator 1 can be achieved.

Moreover, it is preferred that the rotary motor used for the locking motor 64 be a small motor.

In this embodiment, the rotary motor is used as the driving source configured to retreat the lock member 60 to release the locking state. However, the rotary motor may be used as a driving source configured to bring the lock member 60 into the locking state (to advance the lock member 60) or may be used as a driving source configured to switch the lock member 60 between both of the locking state and the unlocking state (to advance and retreat the lock member 60).

Moreover, in this embodiment, the sliding screw device comprising the sliding screw nut 61 and the sliding screw shaft 62 is used as the mechanism configured to convert the rotary motion of the locking motor 64 into the linear motion. In such a manner, as a result of employing the sliding screw device, the linear motion can be achieved through the simple configuration having a small number of parts in the configuration of employing the rotary motor as the driving source. Thus, further downsizing can be achieved.

In this embodiment, there is employed such a configuration that the sliding screw nut 61 is caused to perform the linear motion by rotating the sliding screw shaft 62. However, conversely, the sliding screw shaft 62 may be caused to perform the linear motion by rotating the sliding screw nut 61. In other words, by fixing the sliding screw nut 61 to the output shaft 64a of the locking motor 64, and fixing the sliding screw shaft 62 to the lock member 60, the sliding screw nut 61 is rotated by the drive by the locking motor 64, thereby being capable of integrally advancing and retreating the sliding screw shaft 62 and the lock member 60.

As described above, when the sliding screw device is used, the configuration to restrict the rotation of the member of the sliding screw device performing the linear motion is required. In this embodiment, the through hole 41g having the rectangular cross section is formed in the baring case 41, and the lock member 60 having the flat plate shape is inserted into the through hole 41g, thereby restricting the rotation of the member (sliding screw nut 61) of the sliding screw device performing the linear motion. In such a manner, the bearing case 41, which is a part of the actuator case, has the function as the rotation restriction part. As a result, it is not required to independently provide a member configured to restrict the rotation of the sliding screw nut 61, which is advantageous for the downsizing.

As another configuration of this embodiment, a projection may be formed on an outer peripheral surface of the sliding screw nut 61, and the rotation of the sliding screw nut 61 may be restricted by bringing the projection into abutment against an inner surface of the bearing case 41. When the portion configured to restrict the rotation of the sliding screw nut 61 is far in the radial direction from the output shaft 64a of the locking motor 64, a moment received by the portion configured to restrict the rotation increases, and it is determined that a resistance against the linear motion of the sliding screw nut 61 increases. Therefore, it is desired that the portion configured to restrict the rotation be at a position as close as possible to the output shaft 64a of the locking motor 64 in the radial direction. In this respect, in this embodiment, the distal end portion side of the lock member 60 is arranged coaxially with the output shaft 64a of the locking motor 64 (see FIG. 1 and FIG. 8). With this configuration, the rotation can be restricted at the position close to the output shaft 64*a* in the radial direction, and the resistance against the sliding screw nut 61 can be reduced. As a result, action performance of the lock member 60 increases, and reliability of the electric actuator increases.

In this embodiment, the rotation is transmitted from the drive gear 30 to the driven gear 31 at a constant speed. However, the rotation may be transmitted from the drive gear 30 to the driven gear 31 while the speed of the rotation is reduced. In this case, the drive gear 30 is high in rotation speed, but low in rotation torque compared to the driven gear 31. Thus, when not the driven gear 31 high in rotation torque but the drive gear 30 low in rotation torque is used as the gear to be engaged with the lock mechanism part 7, a load on the lock mechanism part 7 during the engagement can thus be reduced. Moreover, in this case, when the drive gear 30 having the higher rotation speed is used as the gear to be engaged with the lock mechanism part 7, the positioning of the drive gear 30 can thus finely be carried out in the rotation direction compared to a case in which the driven gear 31 after the speed reduction is used as the gear to be engaged with the lock mechanism part 7. As a result, an accuracy of stopping the motion conversion mechanism part 3 increases.

Now, description is made of another embodiment of the present invention. A portion other than that described below basically has the same configuration as that of the above-mentioned embodiment, and description of the same portion is thus omitted.

Also in this embodiment, similarly to the embodiment described above, the lock sensor 69 configured to detect the advanced and retreated positions of the lock member 60 in order to recognize whether or not the locking state is brought about is mounted to the bearing case 41 (see FIG. 8). The lock sensor 69 comprises the contact element 69*a* formed of an elastic member such as a plate spring. When the lock member 60 advances, the lock member 60 pushes the contact element 69*a*, and the position of the lock member 60 is thus detected.

Now, description is made of an operation of the lock mechanism part 7.

When power is not supplied to the locking motor 64, the lock member 60 is maintained at the locking position having reached after being advanced by the spring 65, and is in the locking state in which the distal end portion of the lock member 60 is engaged with the engagement hole 30*a* of the drive gear 30. When the power is supplied to the driving motor 10 in order to start the driving of the ball screw shaft 24 from this state, the power is also supplied to the locking motor 64, and the locking motor 64 drives the lock member 60 in a direction of retreating the lock member 60. As a result, the slide screw shaft 62 rotates. At this time, the rotation of the sliding screw nut 61 is restricted through the insertion of the distal end portion in the flat plate shape of the lock member 60 into the through hole 41*g* having the rectangular cross section. Thus, when the sliding screw shaft 62 rotates, the sliding screw nut 61 retreats against the urging force of the spring 65, and the lock member 60 also retreats integrally with the sliding screw nut 61. With this, the distal end portion of the lock member 60 is disengaged from the engagement hole 30*a* of the drive gear 30, and the locking state is released. In this way, while the ball screw shaft 24 is being driven, the lock member 60 is maintained at the retreated and unlocking position, and the drive gear 30 is thus maintained in an unlocked state.

After that, when the supply of power to the driving motor 10 is shut off, and the driving of the ball screw shaft 24 is thus stopped, the supply of power to the locking motor 64 is also shut off. With this, the driving force for causing the lock member 60 to retreat is no longer generated, and the lock member 60 is thus pushed to move toward the direction of the advance by the spring 65. Then, the locking state is brought about through the engagement of the distal end portion of the lock member 60 with the engagement hole 30*a* of the drive gear 30, and the rotation of the drive gear 30 is thus restricted.

Figure 14:
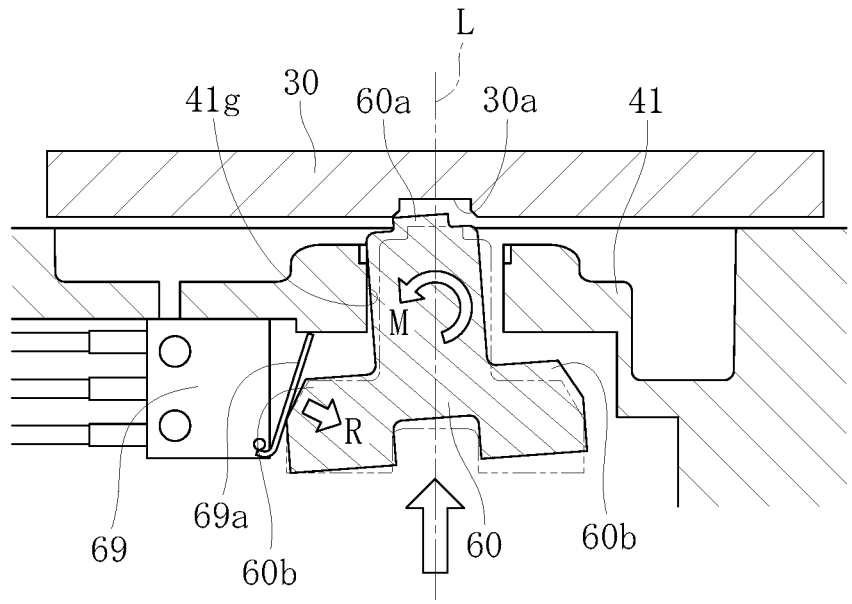
FIG. 14 is an explanatory transverse sectional view for illustrating a cause of an inclination of the lock member.

Incidentally, in the electric actuator of this embodiment, when the lock member 60 is advanced to be brought into the locking state, the contact element 69*a* of the lock sensor 69 comes into contact with one side of the lock member 60, and the lock member 60 may incline with respect to the advancing/retreating direction. Specifically, as illustrated in FIG. 14, a pair of shoulder portions 60*b* are formed on the lock member 60 on opposite sides with respect to a straight line L in the advancing/retreating direction passing through the distal end portion 60*a*, and the contact element 69*a* of the lock sensor 69 comes into contact with one of those shoulder portions 60*b*. When the contact element 69*a* comes into contact in such a way, a contact resistance acts only on the one side of the lock sensor 69. Moreover, a reaction force R from the contact element 69*a* acts in a direction crossing the direction of the advance of the lock member 60. Thus, the lock member 60 receives a moment M in a counterclockwise direction of FIG. 14, and tends to rotate. With this, when the lock member 60 inclines with respect to the advancing/retreating direction thereof, the lock member 60 may be caught on an inner surface of the through hole 41*g*, and may not thus perform a smooth advancing/retreating motion. Moreover, as a result of the occurrence of the inclination of the lock member 60, there is a risk in that the lock member 60 is not inserted into the engagement hole 30*a*, or a risk in that the lock member 60 is inserted into the engagement hole 30*a* but is not pulled off.

Figure 15:
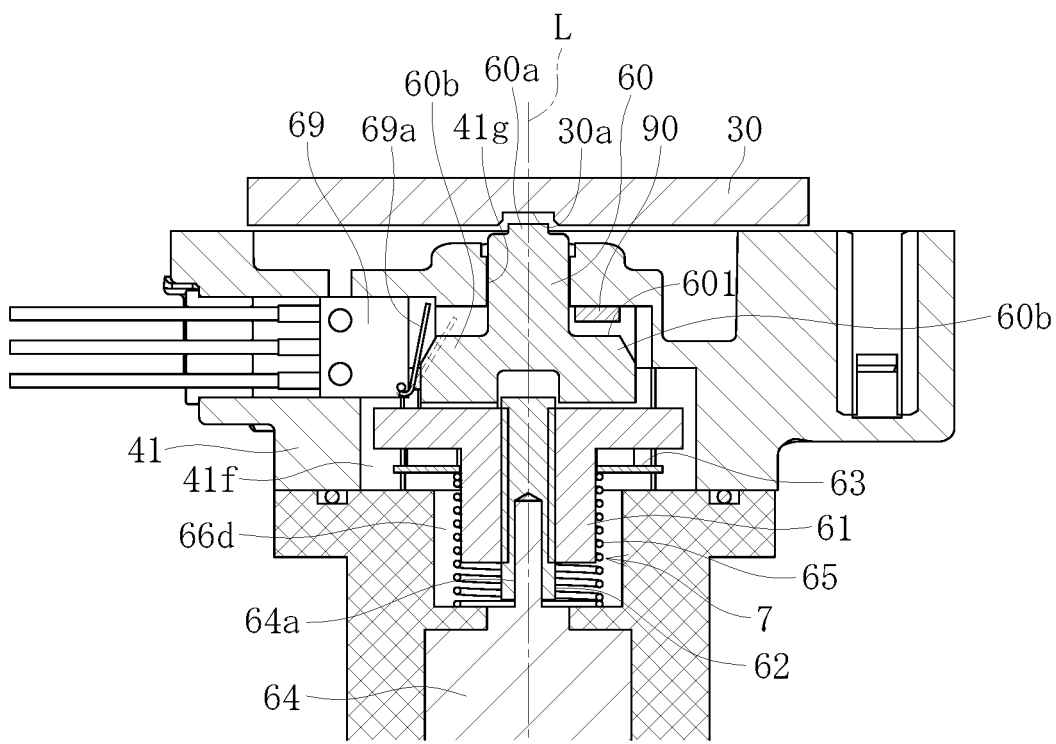
FIG. 15 is a transverse sectional view for illustrating a configuration in which an inclination prevention part is provided on the bearing case.

Thus, in order to prevent such problems in advance, in the electric actuator of this embodiment, an inclination prevention part configured to prevent the inclination of the lock member 60 is provided. In this embodiment, as illustrated in FIG. 15, an inclination prevention part 90 is provided on an inner surface of the bearing case 41. Specifically, the inclination prevention part 90 is arranged on the inner surface of the bearing case 41 so as to be opposed to a front surface (surface facing toward the direction of the advance) 601 of the shoulder portion 60*b* (shoulder portion 60*b* on the right side of FIG. 15) on the side opposite to the side on which the contact element 69*a* of the lock sensor 69 comes into contact with the lock member 60.

Figure 16A:
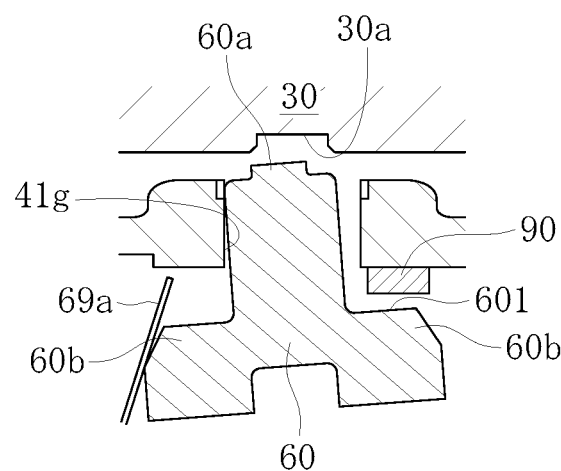
FIG. 16A is a transverse sectional view for illustrating a state in which the lock member is inclined.
Figure 16B:
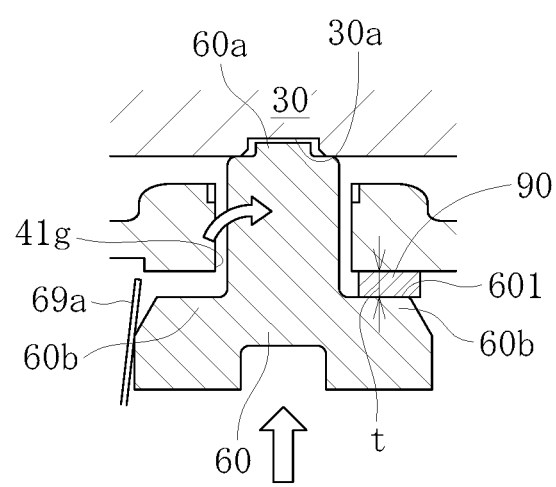
FIG. 16B is an explanatory transverse sectional view for illustrating an action of the inclination prevention part.

Through arrangement of the inclination prevention part 90 at such a position, when the lock member 60 is advanced, the front surface 601 of the shoulder portion 60*b* on the right side is brought into abutment against the inclination prevention part 90. With this, as illustrated in FIG. 16A, even when the lock member 60 inclines, as illustrated in FIG. 16B, a moment in a clockwise direction of FIG. 16B acts on the lock member 60 through the abutment of the lock member 60 against the inclination prevention part 90. Thus, the posture of the lock member 60 is recovered, and the inclination is reduced or eliminated.

Timing at which the lock member 60 is brought into abutment against the inclination prevention part 90 when the lock member 60 is advanced can be adjusted by changing a thickness "t" (see FIG. 16B) of the inclination prevention part 90. When the inclination prevention part 90 is excessively thick, the distal end portion 60*a* of the lock member 60 cannot be inserted into the engagement hole 30*a*. When the inclination prevention part 90 is excessively thin, the timing of correcting the inclination becomes late, and the expected effect is hardly obtained. Therefore, it is desired to appropriately set the thickness "t" of the inclination prevention part 90 so that the insertion of the lock member 60 into the engagement hole 30*a* is not prevented, and that the inclination can be corrected at as early timing as possible.

As described above, in the electric actuator of the present invention, the inclination of the lock member 60 can be reduced or eliminated through provision of the inclination prevention part 90. Further, it is possible to avoid a situation in which the lock member 60 is caught in the through hole 41*g* or the engagement hole 30*a*, or cannot be inserted into the engagement hole 30*a*. With this, the certainty of the locking and the unlocking increases, and the reliability increases. Moreover, the smooth advancing/retreating operation of the lock member 60 can be achieved with the simple configuration of only mounting the inclination prevention part 90 on the bearing case 41, which is advantageous for the cost reduction and the downsizing of the device.

In the above-mentioned embodiments, the inclination of the lock member occurs through contact with the lock sensor, but the present invention is not limited to this case. The present invention can also be applied to an electric actuator in which an inclination occurs in the lock member due to, for example, interference or contact with peripheral members other than the lock sensor.

Figure 17:
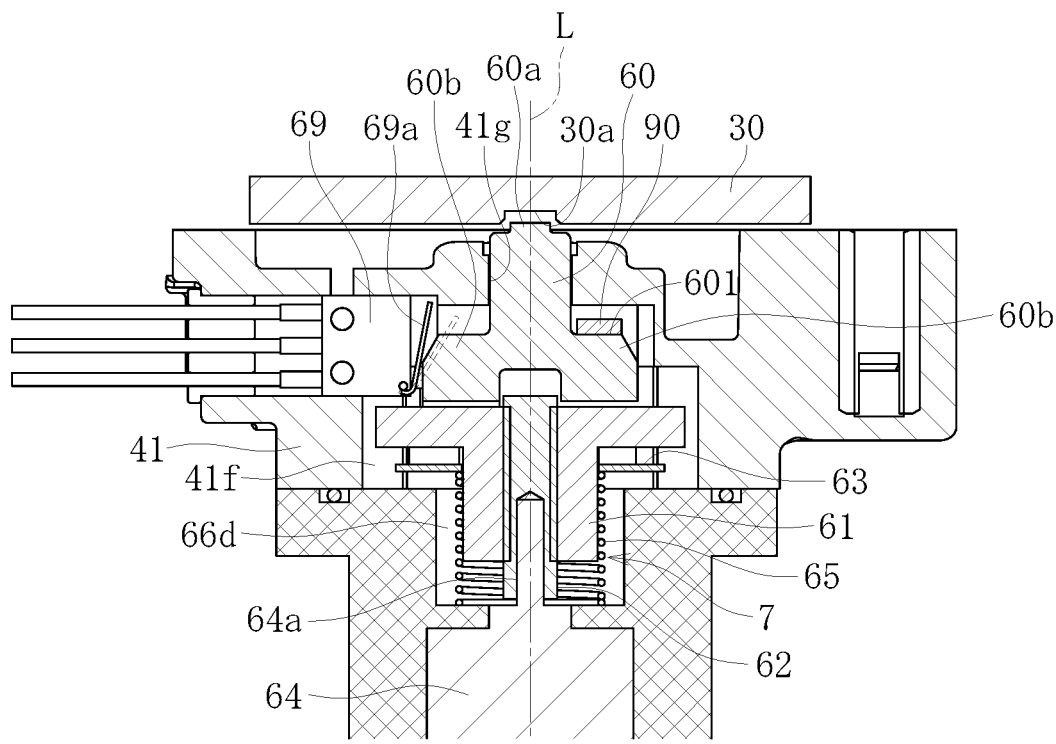
FIG. 17 is a transverse sectional view for illustrating a configuration in which the inclination prevention part is provided on the lock member.

Moreover, as in an example illustrated in FIG. 17, the inclination prevention part 90 may be provided not on the bearing case 41, but on the lock member 60. In this case, the inclination prevention part 90 is provided on the front surface 601 of the shoulder portion 60*b* on the opposite side of the shoulder portion 60*b* with which the lock sensor 69 comes into contact. The inclination prevention part 90 is brought into abutment against the inner surface of the bearing case 41 through the advance of the lock member 60, and the inclination of the lock member 60 is reduced or eliminated in a manner similar to that described above. Moreover, the inclination prevention part 90 may be formed integrally with the actuator case such as the bearing case 41 or the lock member 60 without being provided independently.

Moreover, low-friction treatment may be applied to a surface of the lock member 60 (the surface may be formed of a low-friction surface) in order to increase a slide performance of the lock member 60 with respect to the engagement holes 30*a* and the through hole 41*g*, and to suppress wear due to interference with those holes 30*a* and 41*g*. As the low-friction treatment, for example, there can be applied so-called molybdenum disulfide shot treatment of spraying fine molybdenum disulfide powders on a surface of an object to be treated at high speed to cause the powders to collide with the surface, to thereby form a layer of molybdenum disulfide on the surface of the object to be treated. A portion to be subjected to the low-friction treatment may be an entire surface of the lock member 60, but it is only required to subject at least portions in contact with the engagement holes 30*a* and the through hole 41*g* to the low-friction treatment.

Figure 18:
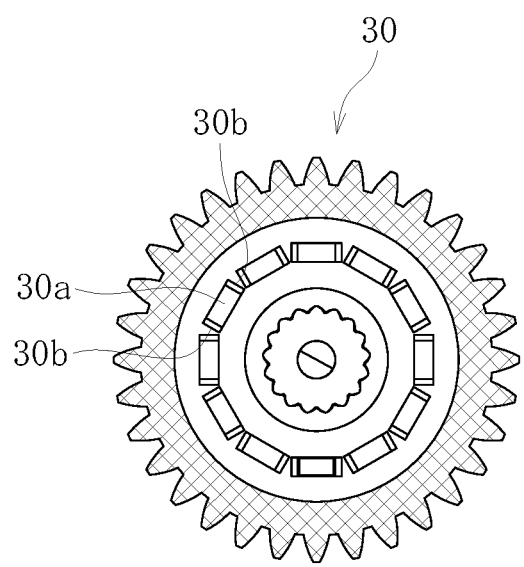
FIG. 18 is a view for illustrating a drive gear made of constituent materials that are different between a portion of teeth and a portion of engagement holes.

Moreover, as in an example illustrated in FIG. 18, the drive gear 30 may be formed by insert molding or the like so that only a portion of the teeth and a peripheral portion thereof (crosshatched region of FIG. 18) of the drive gear 30 are formed of metal, and that the other portion in which the engagement holes 30*a* are formed is formed of resin (resin having a low-friction surface) subjected to the low-friction treatment. In this case, surfaces of the engagement holes 30*a* form low-friction surfaces. Thus, the slide performance of the lock member 60 with respect to the engagement holes 30*a* can be increased, and the wear due to the interference between the lock member 60 and the engagement holes 30*a* can be suppressed. Further, through application of the low-friction treatment also to the surface of the lock member 60 as described above in addition to forming the portion of the engagement holes 30*a* of the resin subjected to the low-friction treatment, the slide performance of the lock member 60 and the wear suppression effect can further be increased.

Figure 19:
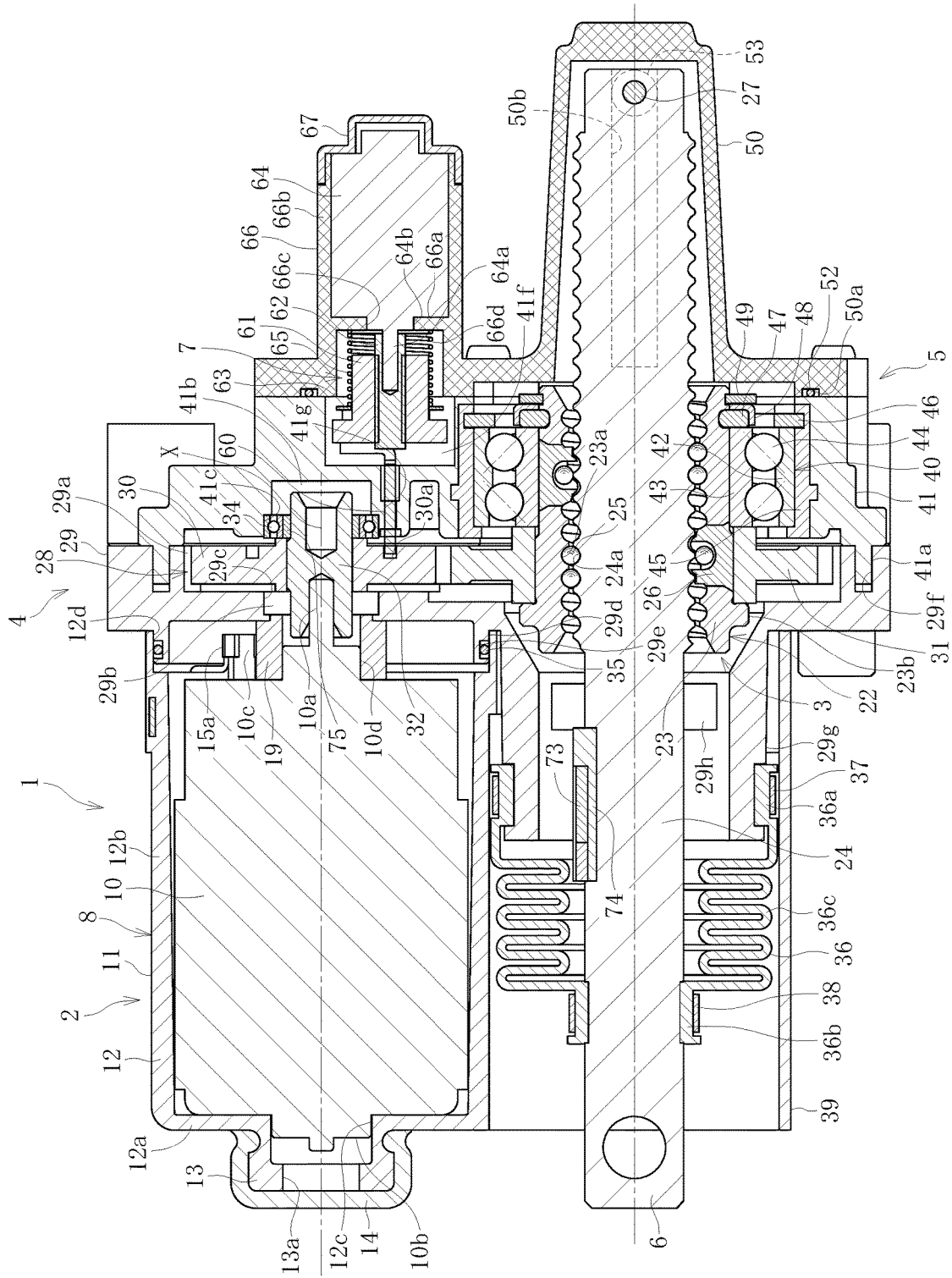
FIG. 19 is a vertical sectional view of the electric actuator according to still another embodiment of the present invention.
Figure 20:
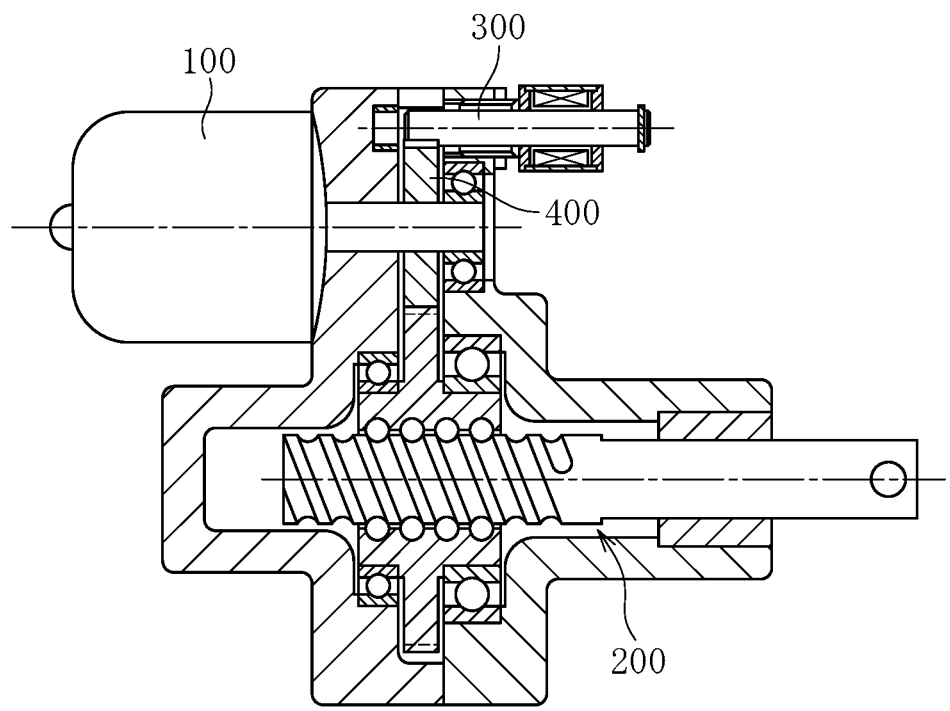
FIG. 20 is a vertical sectional view of a related-art electric linear actuator.

FIG. 19 is a view of the electric actuator 1 according to still another embodiment of the present invention.

The electric actuator 1 illustrated in FIG. 19 is configured, compared to the electric actuator 1 illustrated in FIG. 1, by eliminating the speed reduction mechanism part 9, directly coupling the motor part 8 and the driving force transmission part 4 to each other. In this case, the drive part 2 comprises only a motor part 8. Thus, the speed reduction mechanism part 9 is not provided, and hence the output shaft 10*a* of the driving motor 10 is press-fitted to the gear boss 32, and the rolling bearing 33 on the transmission gear case 29 side configured to support the gear boss 32 is omitted. Moreover, a member to be fitted to the motor adaptor 19, to which the driving motor 10 is mounted, is changed from the speed reduction gear case 17 to the transmission gear case 29, and is thus replaced by one having a different shape conforming to a fitting shape of the member to be fitted to the motor adaptor 19. The other configurations are the same as those of the embodiment illustrated in FIG. 1. The electric actuator 1 of the embodiment illustrated in FIG. 19 is controlled to operate basically in the same manner as in the embodiments described above except that the driving force from the driving motor 10 is directly transmitted to the driving force transmission part 4 without intermediation of the speed reduction mechanism part 9. Thus, description of the control and the operation is omitted.

Also in the electric actuator 1 illustrated in FIG. 19, as in the electric actuator 1 illustrated in FIG. 1, the downsizing of the electric actuator 1 can be achieved through use of the rotary motor (locking motor 64) as the driving source configured to drive the lock mechanism part 7, compared to a configuration of using a solenoid as the driving source.

As described above, with the present invention, the downsizing of the electric actuator 1 can be achieved through use of the rotary motor as the driving source configured to drive the lock mechanism part 7. As a result, the downsizing of devices and machines on which the electric actuator is mounted can also be achieved. Thus, the configuration of the electric actuator according to the present invention is also preferred when the electric actuator is produced as series, and is deployed as a plurality of types adapted to applications and usages such as an electric parking brake mechanism for vehicles including two-wheeled vehicles, an electric/hydraulic brake mechanism, an electric shift change mechanism, and an electric power steering as well as a 2WD/4WD electric switching mechanism and an electric shift change mechanism for an outboard engine (for a vessel propulsion engine).

Description has been made of the embodiments of the present invention, but the present invention is not limited to the case in which a DC motor is used as the rotary motor (locking motor 64). A rotary motor other than a DC motor may be used. Moreover, the lock mechanism part 7 is not limited to the one that employs the sliding screw device, but may be one that employs a ball screw device.

The support bearing 40 configured to support the motion conversion mechanism part 3 is not limited to the configuration of using the double-row angular contact ball bearing.

A pair of single-row angular contact ball bearings may be used in combination. Moreover, as the support bearing 40, in addition to the angular contact ball bearing, another double-row bearing using, for example, a deep groove ball bearing may be applied.

The motion conversion mechanism part 3 may be a sliding screw device. However, the ball screw 22 is more preferred in terms of reducing the rotation torque to downsize the driving motor 10.

Moreover, the speed reduction mechanism part 9 may be a speed reduction mechanism other than the planetary-gear speed reduction mechanism 18.

The present invention is not limited to the above-mentioned embodiments. As a matter of course, the present invention may be carried out in various modes without departing from the spirit of the present invention. The scope of the present invention is defined in claims, and encompasses equivalents described in claims and all changes within the scope of claims.

REFERENCE SIGNS LIST 1 electric actuator
2 drive part
3 motion conversion mechanism part
4 driving force transmission part
5 motion-conversion-mechanism support part
6 operation part
7 lock mechanism part
8 motor part
9 speed reduction mechanism part
10 driving motor
10a output shaft
28 transmission gear mechanism
30 drive gear (first gear)
30a engagement hole
41 bearing case
41g through hole
60 lock member
60a distal end portion
60b shoulder portion
61 sliding screw nut
62 sliding screw shaft
64 locking motor
65 spring
69 lock sensor
90 inclination prevention part

The invention claimed is:

1. An electric actuator, comprising:
a drive part;
a motion conversion mechanism part configured to convert a rotary motion from the drive part into a linear motion in an axial direction parallel to an output shaft of the drive part; and
a lock mechanism part configured to prevent the motion conversion mechanism part from converting the rotary motion into the linear motion,
wherein the lock mechanism part comprises:
a rotary motor;
a lock member, which is driven by the rotary motor so as to be brought into at least any one of a locking state of preventing the motion conversion mechanism part from converting the rotary motion into the linear motion and an unlocking state of releasing the locking state; and
a spring, which is configured to urge the lock member in a direction that brings the lock member into the locking state, and
wherein the rotary motor is configured to drive the lock member so that the lock member is switched to the unlocking state against an urging force of the spring when the drive part performs driving.

2. The electric actuator according to claim 1, wherein an engagement hole, with which the lock member is engaged, is formed in a side surface crossing an axial direction of a gear configured to transmit a driving force from the drive part to the motion conversion mechanism part.

3. The electric actuator according to claim 1, further comprising:
a driving force transmission part, which comprises a transmission gear mechanism configured to transmit a driving force from the drive part to the motion conversion mechanism part; and
an inclination prevention part configured to prevent an inclination of the lock member in an advancing/retreating direction,
wherein the lock member is advanced and retreated so as to be movable between a locking position of preventing the motion conversion mechanism part from converting the rotary motion into the linear motion and an unlocking position of not preventing the motion conversion mechanism part from converting the rotary motion into the linear motion.

4. The electric actuator according to claim 3, wherein a surface of the lock member is a low-friction surface having a lower friction than another part of the lock member.

5. The electric actuator according to claim 3,
wherein the transmission gear mechanism comprises a gear, which has an engagement hole formed so that the lock member is engageable with and disengageable from the engagement hole, and
wherein a tilted surface is formed at an entrance portion of the engagement hole.

6. The electric actuator according to claim 3,
wherein the transmission gear mechanism comprises a gear, which has an engagement hole formed so that the lock member is engageable with and disengageable from the engagement hole, and
wherein a portion of the engagement hole of the gear is formed of resin having a low-friction surface having a lower friction than another part of the gear, and a portion of teeth of the gear is formed of metal.

7. The electric actuator according to claim 3, further comprising a lock sensor, which is configured to detect advanced and retreated positions of the lock member by coming into contact with the lock member,
wherein the inclination prevention part is provided on an actuator case on a side opposite to a side on which the lock sensor comes into contact with the lock member, and
wherein, when the lock member is advanced to move to the locking position, the lock member is recovered from an inclined state through abutment of a surface of the lock member on the side opposite to the side on which the lock sensor comes into contact with the lock member against the inclination prevention part.

8. The electric actuator according to claim 7,
wherein the transmission gear mechanism comprises a gear, which has an engagement hole formed so that the lock member is engageable with and disengageable from the engagement hole, wherein the lock member comprises a distal end portion, which is inserted into and engaged with the engagement hole, and a pair of shoulder portions, which are arranged on opposite sides with respect to a straight line passing through the distal end portion in the advancing/retreating direction, wherein the lock sensor is arranged at a position of being capable of coming into contact with one of the shoulder portions, and wherein the inclination prevention part is provided on the actuator case so as to be opposed to another of the shoulder portions on an opposite side of the one of the shoulder portions with which the lock sensor comes into contact.

9. The electric actuator according to claim 3, further comprising a lock sensor, which is configured to detect advanced and retreated positions of the lock member by coming into contact with the lock member, wherein the inclination prevention part is provided on the lock member on a side opposite to a side on which the lock sensor comes into contact with the lock member, and wherein, when the lock member is advanced to move to the locking position, the lock member is recovered from an inclined state through abutment of the inclination prevention part against an actuator case.

10. The electric actuator according to claim 9, wherein the transmission gear mechanism comprises a gear, which has an engagement hole formed so that the lock member is engageable with and disengageable from the engagement hole, wherein the lock member comprises a distal end portion, which is inserted into and engaged with the engagement hole, and a pair of shoulder portions, which are arranged on opposite sides with respect to a straight line passing through the distal end portion in the advancing/retreating direction, wherein the lock sensor is arranged at a position of being capable of coming into contact with one of the shoulder portions, and wherein the inclination prevention part is provided on another of the shoulder portions on an opposite side of the one of the shoulder portions with which the lock sensor comes into contact.

\* \* \* \* \*